US007929242B2

(12) United States Patent
Takakura

(10) Patent No.: US 7,929,242 B2

(45) Date of Patent: Apr. 19, 2011

(54) MAGNETIC DISK APPARATUS AND METHOD FOR CONTROLLING MAGNETIC HEAD

(75) Inventor: Shinji Takakura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 129 days.

(21) Appl. No.: 12/257,062

(22) Filed: Oct. 23, 2008

(65) Prior Publication Data

US 2009/0195913 A1 Aug. 6, 2009

(30) Foreign Application Priority Data

Oct. 23, 2007 (JP) ................................ 2007-275078

(51) Int. Cl.
*G11B 21/02* (2006.01)
*G11B 5/596* (2006.01)

(52) U.S. Cl. ..................... 360/75; 360/78.04; 360/78.09

(58) Field of Classification Search ........................ None
See application file for complete search history.

(56) References Cited

U.S. PATENT DOCUMENTS

| | | | | |
|---|---|---|---|---|
| 7,031,099 | B2 * | 4/2006 | Kohso et al. | 360/78.05 |
| 7,619,850 | B2 * | 11/2009 | Takakura | 360/78.09 |
| 7,636,605 | B2 * | 12/2009 | Takakura | 700/45 |
| 2009/0040647 | A1 | 2/2009 | Takakura | |

FOREIGN PATENT DOCUMENTS

| | | |
|---|---|---|
| JP | 09-073618 | 3/1997 |

OTHER PUBLICATIONS

Yatsu, et al. Seek Control Method of Hard Disk Drives Using Model Following Control, The 74th JSME Spring Annual Meeting, vol. 4, pp. 410-411, 1997.

* cited by examiner

*Primary Examiner* — K. Wong

(74) *Attorney, Agent, or Firm* — Turocy & Watson, LLP

(57) ABSTRACT

A magnetic disk apparatus includes: a driving section for moving a magnetic head recoding and reproducing information in a magnetic disk; and a controller for controlling the driving section. The controller includes: a position-error feedback control system having an integrator and a phase lead compensator and obtaining a position command based on difference between target position and detection position of the magnetic head to perform feedback control of the driving section; and a two-freedom-degree control system inputting a target move distance of the magnetic head and outputting a current command to the driving section by using a mathematical model of the driving section. The controller providing the driving section with an output of the integrator and therewith updating the mathematical model by using an output of the phase lead compensator, in each of the times of positioning control and seek of the magnetic head.

8 Claims, 15 Drawing Sheets

MAGNETIC DISK APPARATUS AND METHOD FOR CONTROLLING MAGNETIC HEAD

CROSS-REFERENCE TO RELATED APPLICATIONS

This application is based upon and claims the benefit of priority from the prior Japanese Patent Application No. 2007-275078, filed on Oct. 23, 2007; the entire contents of which are incorporated herein by reference.

BACKGROUND OF THE INVENTION

1. Field of the Invention

This invention relates to a magnetic disk apparatus in which a magnetic head is moved on a rotating magnetic disk and to a method for controlling the magnetic head.

2. Background Art

In a control system for positioning a magnetic head of the magnetic disk apparatus, a digital control system using microcomputer is generally composed. That is, control command is calculated inside a microprocessor from position information of the magnetic head that is discretely obtained, and an activation drive of an actuator is provided with the control command through D/A (Digital-Analog converter). In general, because an actuator has mechanical resonance in a high-frequency band, it is very important that a feedforward control input that does not excite mechanical resonance is generated in order to move the magnetic head to a target position with high speed, low vibration, and low noise.

As a method for moving the magnetic head by a short distance at high speed, it is thought that the feedforward control input for the actuator so that the mechanical resonance is not excited and a target position command to a feedback control system are preliminarily calculated by an optimization method and held as a table. However, it is impossible from the memory capacity of microprocessor to adopt such a method with respect to every seek distance. Therefore, in the case of long distance seek, the feedforward control input for the actuator and the target position command have to be generated online.

As a method therefor, there can be thought a method for, providing an actuator model inside the control system, making the model velocity comply with the target velocity curve, and thereby providing the feedback control system with the control command to the model and the model position as the feedforward control input to the actuator and the target position command respectively (JP-A 9-73618 (Kokai) (1997)). However, in the head positioning control system described in JP-A 9-73618 (Kokai) (1997), if position and velocity of the model are not near the actual position and velocity of the magnetic head, the magnetic head comes to overshoot in settling or the like. Therefore, some model modification becomes required in the seek.

As a method therefor, there is a method for, updating the model by adding the feedback control output to the input of the model, estimating position and velocity of the magnetic head by the model, and composing the velocity control system by using the estimated position and velocity of the model, in the seek first half (for example, The 74th JSME (Japan Society of Mechanical Engineers) Spring Annual Meeting, Vol. 4, pp. 410-411 (1997) (in Japanese), FIG. 3). In this method, further, in the seek second half in which the magnetic head comes near the target position, the feedback control output is switched to be added to the actuator, and thereby, a general two-freedom-degree control system is composed.

By the way, when a servo system has to be composed like the magnetic disk apparatus, the feedback controller has an integrator. Therefore, when such a seek control system is composed, output of the integrator is also added to the model and therefore the output of the integrator becomes large when an external force such as magnet latch force is large. Therefore, in switching to a general two-freedom-degree control system, transient response comes to occur in the control command.

Moreover, in the case of the magnetic disk apparatus, when the magnetic head moves at high speed, servo pattern becomes diagonally crossed and position detection noise becomes large. The position detection noise influences the velocity feedback control system of the model side through the feedback control output, and therefore, vibratory feedforward control command becomes generated. This can also cause quack. From these things, in the control system described in the JP-A 9-73618 (Kokai) (1997) or The 74th JSME Spring Annual Meeting, Vol. 4, pp. 410-411 (1997), FIG. 3, it is difficult to realize robust seek control in the environment in which a large external force works. Furthermore, it is also difficult to reduce the influence of the position detection noise.

SUMMARY OF THE INVENTION

According to an aspect of the invention, there is provided a magnetic disk apparatus including: a driving section for moving a magnetic head recoding and reproducing information in a magnetic disk; and a controller for controlling the driving section, the controller including: a position-error feedback control system having an integrator and a phase lead compensator and obtaining a position command based on difference between target position and detection position of the magnetic head to perform feedback control of the driving section; and a two-freedom-degree control system inputting a target move distance of the magnetic head and outputting a current command to the driving section by using a mathematic model of the driving section, the controller providing the driving section with an output of the integrator and therewith updating the mathematical model by using an output of the phase lead compensator, in each of the times of positioning control and seek of the magnetic head.

According to an aspect of the invention, there is provided a method for controlling a magnetic head in which the magnetic head recoding and reproducing information in a magnetic disk is moved, including: performing feedback control of a driving section of the magnetic head by obtaining position command based on difference between target position and detection position of the magnetic head by using an integrator and a phase lead compensator, therewith performing control by inputting a target move distance of the magnetic head and outputting a current command to the driving section by using a mathematic model of the driving section, and providing the driving section with an output of the integrator and therewith updating the mathematical model by using an output of the phase lead compensator, in each of the times of positioning control and seek of the magnetic head.

DETAILED DESCRIPTION OF THE INVENTION

Figure 1:
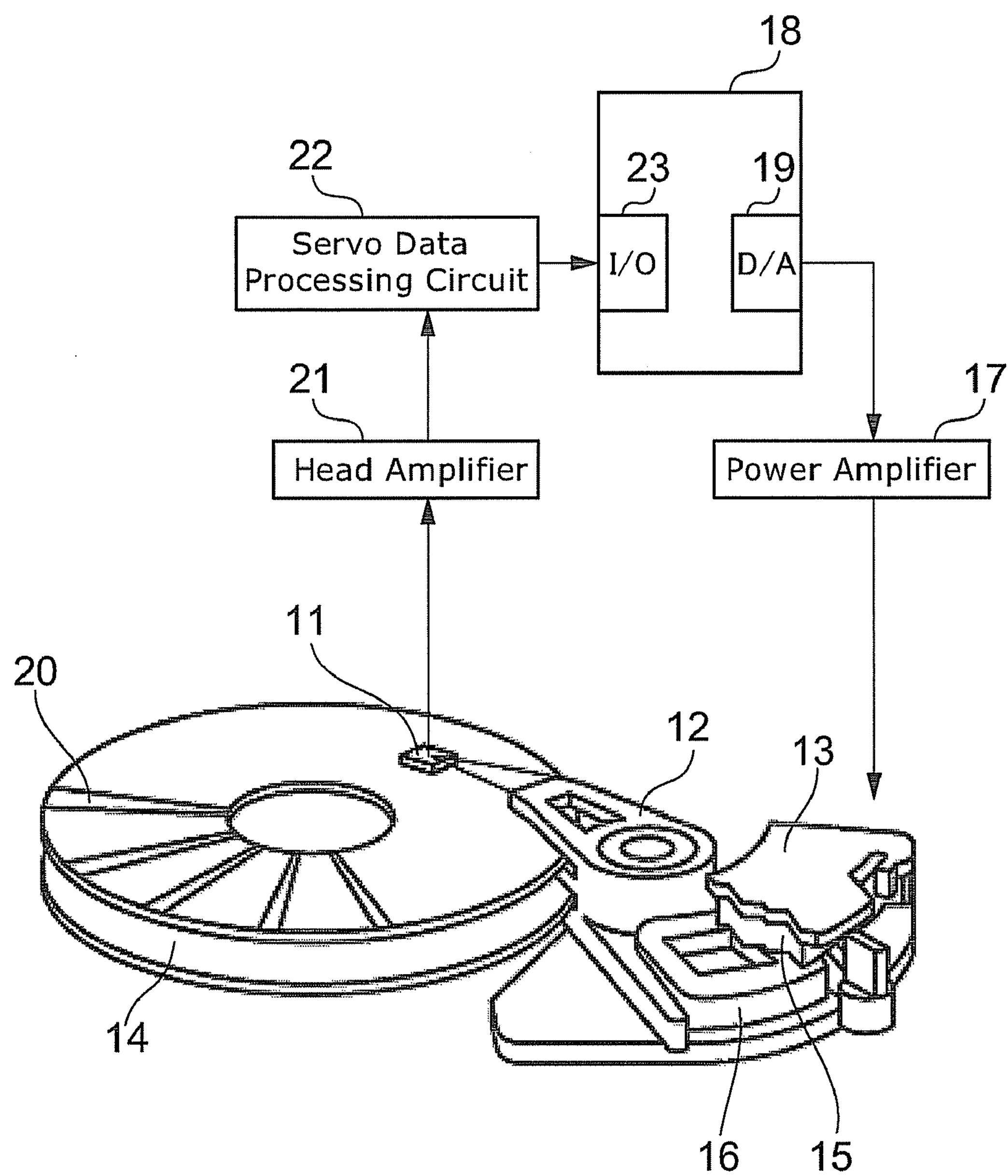
FIG. 1 is a concept diagram showing a substantial part of a magnetic disk apparatus according to an embodiment of the invention.

Hereinafter, embodiments of the invention will be explained with reference to drawings. In the drawings, the same signs are appended to the same components and detailed explanation thereof will be appropriately omitted.

FIG. 1 is a concept diagram showing a substantial part of a magnetic disk apparatus according to an embodiment of the invention. The magnetic disk apparatus of the embodiment has a head positioning control mechanism (controller) in which a microprocessor (MPU) 18 serves as the main component. The magnetic head 11 is supported by an arm 12, and the arm 12 moves the magnetic head 11 in the radial direction of a disk 14 by a driving force of a driving section (hereinafter, referred to as voice coil motor (VCM)) 13. The VCM 13 has a magnet 15 and a drive coil 16 and is driven by a current supplied from a power amplifier 17. The MPU 18 calculates the control command, and the control command is converted into an analog signal by a D/A converter 19 and provided to the power amplifier 17. The power amplifier 17 converts the control command from the MPU 18 into the driving current and supplies the driving current to VCM 13.

One or a plurality of disk(s) 14 is/are provided and rotate(s) at high speed by a spindle motor. A plurality of tracks are concentrically formed on the disk 14, and servo areas 20 are provided by constant intervals. In the servo area 20, position information of the track are preliminarily buried, and the magnetic head 11 crosses the servo area 20 and thereby the signal from the magnetic head 11 is taken by a head amplifier 21, and the lead signal is amplified and the signal is supplied to a servo data processing circuit 22. The servo data processing circuit 22 generates servo information from the amplified lead signal and outputs the servo information to the MPU 18 by constant time intervals. The MPU 18 calculates the position of the magnetic head 11 from the servo information taken from I/O 23 and calculates the control command to be flowed from the obtained magnetic head position to VCM 13 by constant time intervals.

Figure 2:
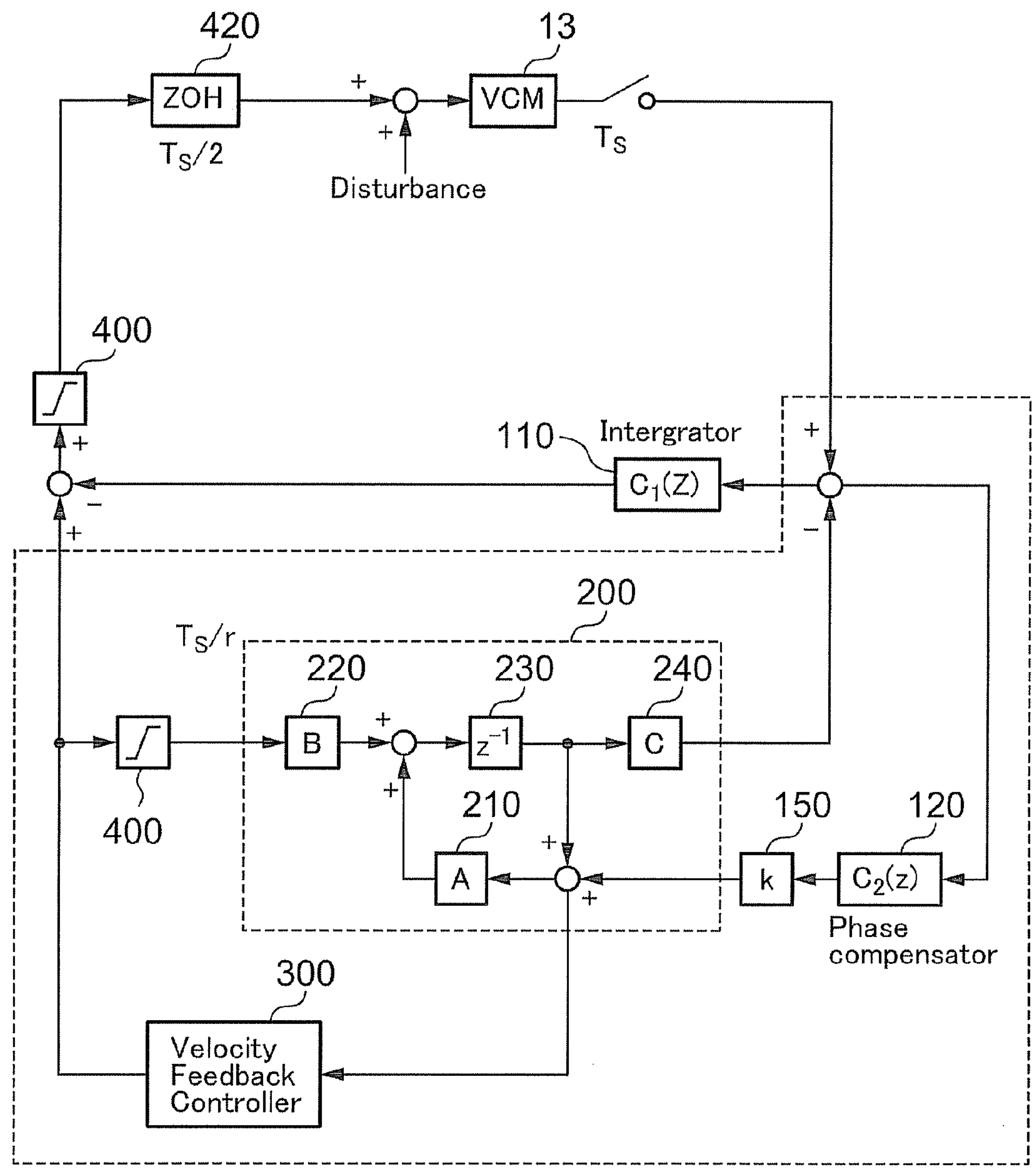
FIG. 2 is a block diagram illustrating a control system according to the embodiment of the invention.

FIG. 2 is a block diagram illustrating a control system according to the embodiment of the invention.

The control system shown in FIG. 2 has a position error feedback control system 100 (see, FIG. 4) and a model-side control system 200. In the embodiment, the position error feedback control system 100 is divided into an integrator 110 and a phase lead compensator 120. The output of the integrator 110 is constantly input into the actuator (VCM) 13 through a limiter 400 and a zeroth-order holder 420. On the other hand, the output of the phase lead compensator 120 is input into the model-side control system 200 through a gain vector 150.

In the model-side control system 200, a velocity control system with respect to a virtual mathematical model of the actuator 13 is constructed, and model velocity is made to comply with target velocity and thereby feedforward control input is generated. The feedforward control input that is output from the model-side control system 200 is input into the velocity feedback controller (velocity feedback control system) 300 and output as the feedforward control input to the voice coil motor 13 through the limiter 400 and the zeroth-order holder 420. Moreover, in the model-side control system 200, A matrix 210, B matrix 220, and C matrix 240, which are state equations, and a 1-sample delay 230 are combined.

For example, in seek of a long distance, it is necessary to compose the velocity feedback system, but in the case of the magnetic disk apparatus, only position of the magnetic head 11 can be observed. Therefore, it is necessary to estimate the velocity of the magnetic head 11 by using a model. If the model is accurate, seek control without overshoot or the like can be realized, but actually, accurate model cannot be obtained. Therefore, compensation of model becomes required.

In such a case, it is conceived to compose the velocity feedback control system from the velocity and position of the estimated magnetic head 11 by using Kalman filter or the like. When such a control system is composed in the seek, a state feedback becomes composed by the estimated position and velocity because the target velocity is nearly straight in the vicinity of the target position. From this, like this embodiment, the same control system can be used in positioning and in the seek. That is, by performing feedback of the estimated position and velocity of the model, the phase lead compensator 120 is composed, and a control system with no switching (switching of a switch) of the control structure that is different from that of the comparative example or the like to be described later can be composed.

As described above, in the control system according to the embodiment, the output of the phase lead compensator 120 is input into the model-side control system 200 in both times of the seek first half (in seek) and the seek second half (in positioning control), and therefore, the switching of the control structure is not required. Moreover, the gain vector 150 and the velocity feedback gain $G_v$ to be described later are set, and thereby, the part surrounded by dashed line in the control system shown in FIG. 2 becomes approximated to a negative phase lead compensator 120 ($-C_2(z)$) in positioning control. Furthermore, in the place that the residual distance to target position is small, the target velocity curve is about straight line and therefore, the velocity feedback controller 300 in positioning control is a state feedback gain L that is a simple invariable gain to be described later.

By contrast, in the comparative example to be described later, in model updating of the seek first half, the output of the position error feedback control system 100 is added to the input terminal of the model-side control system 200, and thereby, the state of the model (position and velocity) is approximated to movement of the actuator 13. And, in the seek second half, the output of the position error feedback control system 100 is switched into the actuator 13 and is to be a general two-freedom-degree control system. By such a method, effect of current saturation and effect of a model error in seek are made to be small. However, in the method of updating the model of this comparative example, transient response is caused in the control command in switching the switch in the case in which a large external force is acting on the control target.

Figure 3:
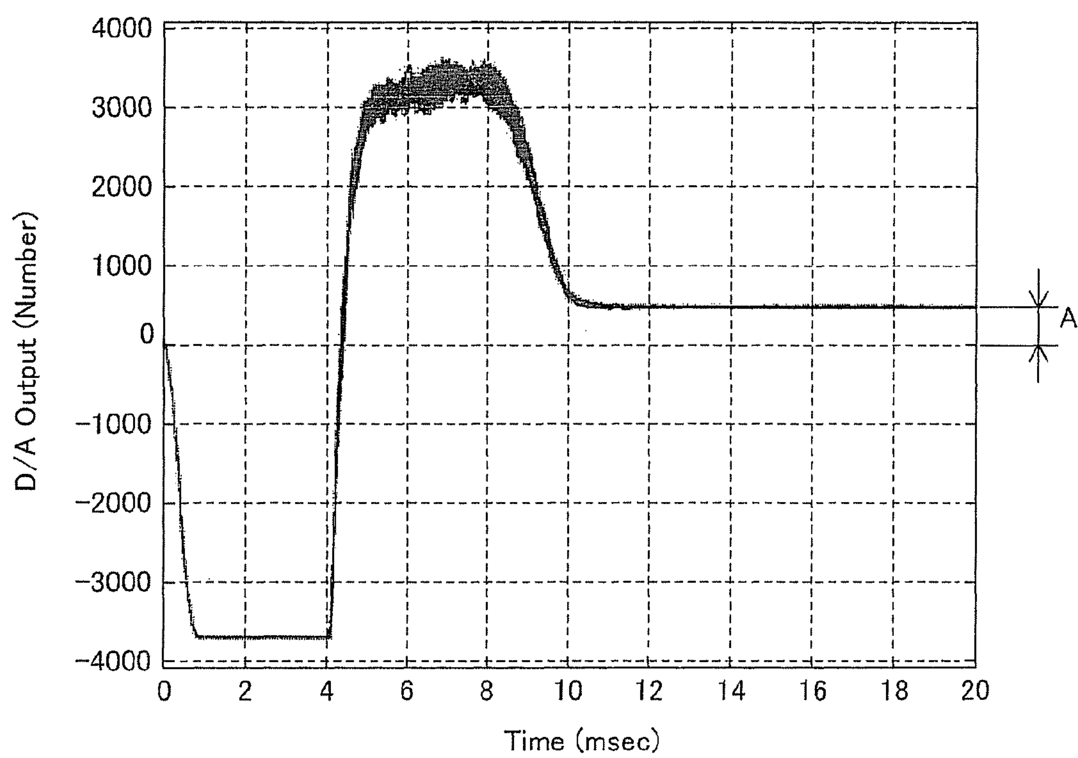
FIG. 3 is a graph view (experimental result) showing control command in performing the seek to the direction that the external force is large in the embodiment.

FIG. 3 is a graph view (experimental result) showing control command in performing the seek to the direction that the external force is large.

The horizontal axis of the graph view shown in FIG. 3 represents time (millisecond) and the vertical axis represents control command value provided to the D/A converter 19. From magnitude A of the control command value at the seek end, it can be seen that the external force of about 10% of the maximum control command value is working in the magnetic disk apparatus used in this experiment.

As shown in FIG. 3, it can be seen that in the seek to the direction that the external force such as magnet latch force is large, the transient response does not occur because the control system of the embodiment does not require switching of the control structure. Furthermore, as described later, also in the seek to the direction that the external force is small, discontinuous control command does not occur because switching of the control structure is not required.

As described above, the output of the phase lead compensator 120 is input to the model-side control system 200 through the gain vector 150, and the output of the integrator 110 is input to the actuator (VCM) 13 through the limiter 400 and the zeroth-order holder 420, and switching of the control structure is not required, and therefore, in the both seeks of the seek to the direction that the external force such as magnet latch force is large and the seek to the direction that the external force is small, transient response does not occur.

Figure 4:
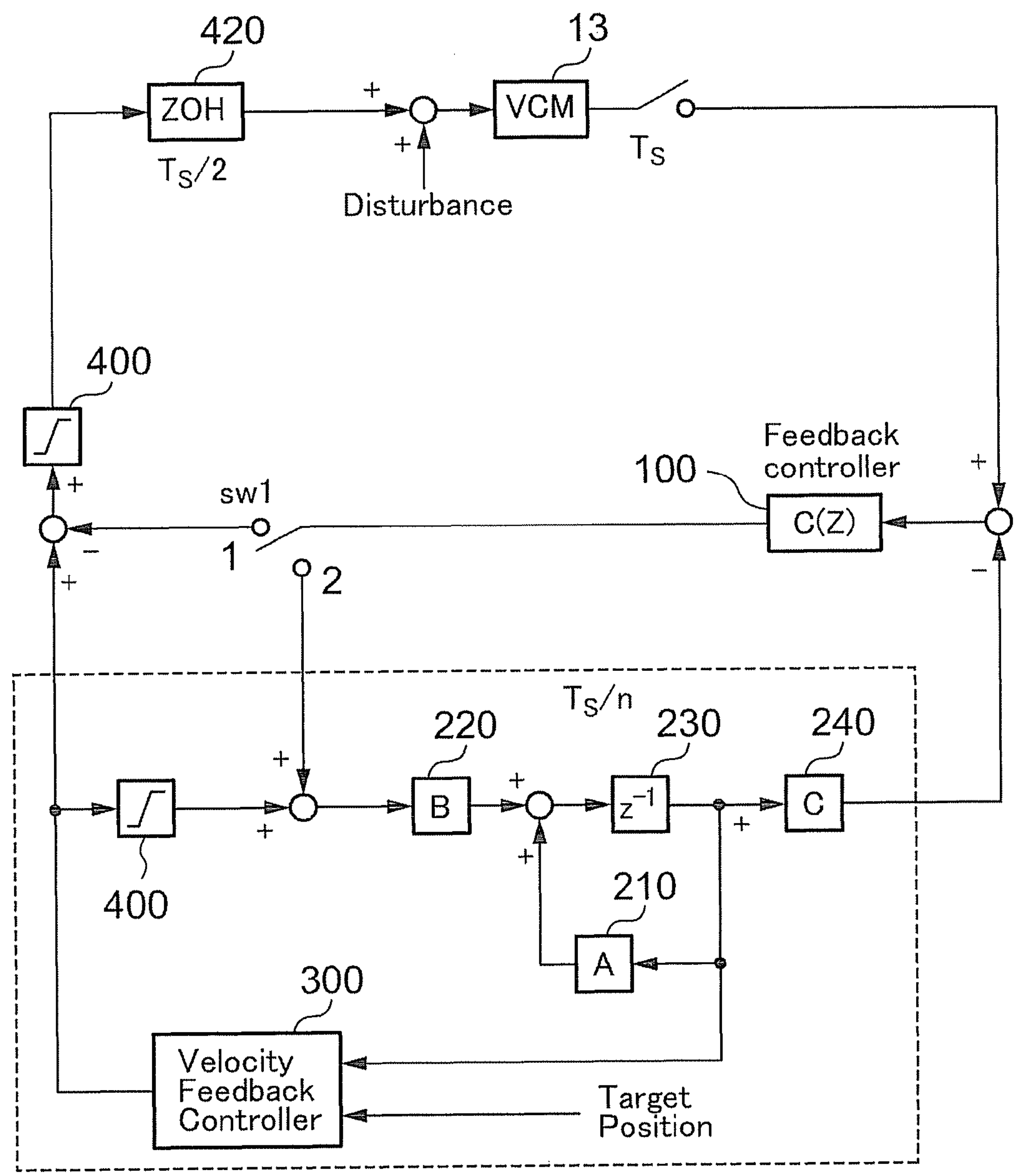
FIG. 4 is a block diagram illustrating a seek control system according to a comparative example.

FIG. 4 is a block diagram illustrating a seek control system according to a comparative example.

In the seek control system shown in FIG. 4, by contrast to the control system according to the embodiment shown in FIG. 2, the position error feedback control system 100 is not divided into the integrator 110 and the phase lead compensator 120. Moreover, the feedforward control input output from the model-side control system 200 is input into the velocity feedback controller 300 with information of position of the target track (Target Position). The other structures are the same as the control system shown in FIG. 2 and therefore explanation thereof will be omitted.

In such a control system, in order to smoothly perform transition from the seek control to the positioning control, the model-side control system 200 is updated by using a positioning controller in the seek first half, and the system is switched to the general two-freedom-degree control system near the target position.

That is, in updating the model-side control system 200 in the seek first half, the output of the position error feedback control system 100 is added to the input of the model-side control system 200 (the switch sw1 is connected to the terminal 2), and thereby, the state of the model (position and velocity) is approximated to movement of the actuator 13. And, in the seek second half, the output of the position error feedback control system 100 is put in the actuator 13 (the switch sw1 is connected to the terminal 1), and thereby, the system is made to be a general two-freedom-degree system. Thereby, effect of the current saturation and effect of position detection noise in the seek are made to be small.

However, in such a seek control system, when a large external force such as magnet latch force works, transient response is occasionally caused in the control command in switching the switch sw1. Furthermore, when the arm 12 is moved at high speed, the magnetic head 11 diagonally crosses the servo area 20, and therefore, comes to wrongly read the cylinder code, and therefore, the position detection noise becomes large. Therefore, through the position error feedback control system 100, the noise influences the velocity feedback controller 300, and vibration component by the noise becomes generated in the control command.

For improving the seek performance of the actuator 13, it is important to provide the actuator 13 with the smooth feedforward control input. Therefore, in the model-side control system 200, the calculation is carried out at the sampling cycle Ts/n, which is n-times of a cycle Ts of the position error feedback control system 100.

Moreover, there is current saturation in acceleration with respect to structure of velocity control system, and therefore, a velocity error is subjected to invariable gain feedback. An accurate model is required for realizing high-performance seek of the actuator 13, but it is difficult from fluctuation or the like to preliminarily prepare high-accurate model. Accordingly, the model-side control system 200 is updated in the seek and the state of the model is approximated to the state of actuator 13.

Figure 5:
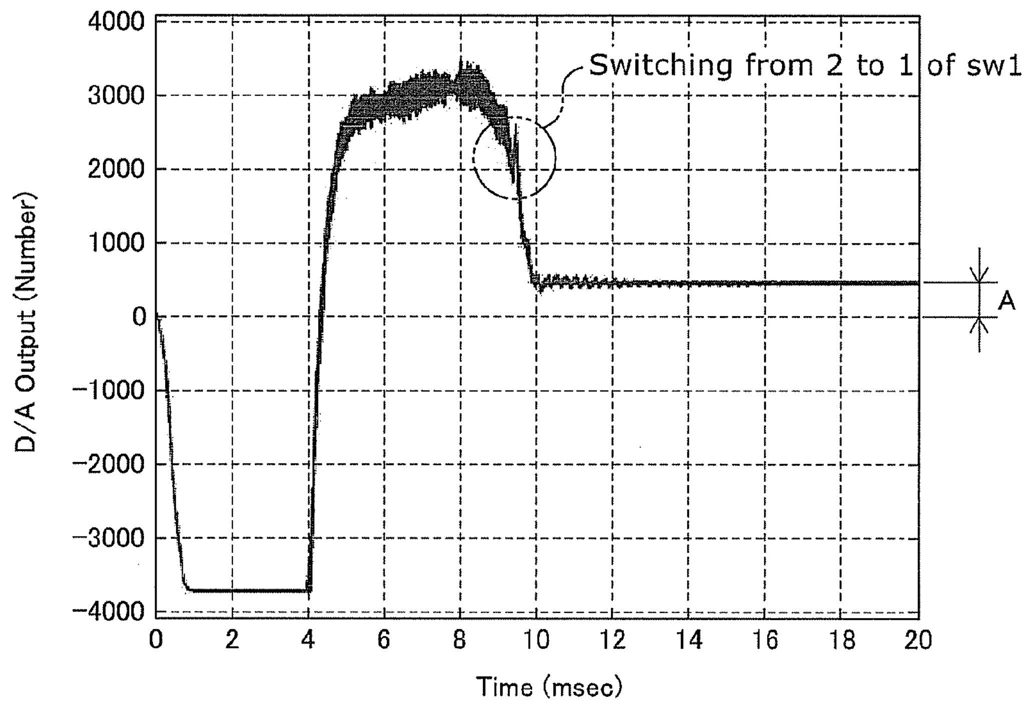
FIG. 5 is a graph view (experiment result) showing the control command in performing the seek to the direction that the external force is large in the comparative example.

FIG. 5 is a graph view (experiment result) showing the control command in performing the seek to the direction that the external force is large.

The horizontal axis of the graph view shown in FIG. 5 represents time (millisecond) and the vertical axis represents control command value provided to the D/A converter 19. From magnitude A of the control command value at the seek end, it can be seen that the external force of about 10% of the maximum control command value is working in the magnetic disk apparatus used in this experiment.

As shown in FIG. 5, it can be seen that in the seek control system in the comparative example, the model-side control system 200 is updated by using a positioning controller in the seek first half and the system is switched to a general two-freedom-degree control system near the target position and therefore discontinuous control command value is generated in switching the switch sw1 in the seek to the direction that the external force such as magnet latch force is large. As described later, in the seek to the direction that the external force is small, the discontinuous control command is not generated.

From these things, in the seek control system according to the comparative example shown in FIG. 4, when the external force is small, there is no problem because the transient response due to switching of the switch sw1 is very small. However, when the large external force such as magnet latch force is acting on the arm 12, the robust property with respect to the external force is low. The precipitous transient response of the control command excites mechanical resonance to cause fluctuation in settling. Therefore, the number of write-protect times becomes large to degrade the performance.

Next, the specific example for composing a control system having no switching of control structure such as a control system according to the embodiment will be explained with reference to drawings.

As described above, because the target velocity is nearly straight in the vicinity of the target position, state feedback is composed by the estimated position and velocity and thereby the control system having no switching of the control structure can be composed.

However, if the seek control to the positioning control is performed by using such a control system for making no switching of the control structure, order of the phase lead compensator 120 becomes fixed to be the second order. Moreover, frequency characteristic becomes determined by Kalman filter coefficient, inclination of the target velocity curve, and velocity feedback gain. Therefore, in the case of such control system, it becomes difficult to provide a discretional frequency characteristic in positioning.

In the case of the magnetic disk apparatus, because flutter disturbance or the like due to vibration of the disk exists in the specified frequency band of the high-frequency band region, it is necessary that frequency characteristic of the positioning control system suitable for the frequency of the disturbance is achieved for achieving the high-preciously positioning control. Accordingly, in the specific example, considering the disturbance characteristic in positioning, the position error feedback control system 100 (C(z)) is preliminarily designed so that the required positioning accuracy can be achieved, and the system is divided into the integrator 110 ($C_1(z)$) and the phase lead compensator 120 ($C_2(z)$) as shown in the following equation.

$$C(z)=C_1(z)+C_2(z) \tag{1}$$

And, output of the integrator 110 is constantly input into the control target (VCM 13). Moreover, in both times of the seek and the positioning control, the model is updated by the output of the position-lead compensator 120, and the output of the velocity feedback controller 300 composed of position and velocity of the model is added to the control target. One example of such a control system is a control system shown in FIG. 2.

That is, the control system shown in FIG. 2 performs the seek control and the positioning control by the output of the velocity feedback controller 300 and the output of the integrator 110. Moreover, as described above, by setting the gain vector 150 and the velocity feedback gain $G_v$ to be described later, the part surrounded by dashed line in the control system shown in FIG. 2 becomes approximated to a negative phase lead compensator 120 ($-C_2(z)$) in positioning control. Furthermore, in the place that the residual distance to target portion is small, the target velocity curve is about straight line and therefore, the velocity feedback controller 300 in positioning control is a state feedback gain L that is a simple invariable gain to be described later.

The state feedback gain L in positioning becomes as the following equation by using equivalent linear control input. b1 represents inclination of the target velocity curve when the residual distance to the target position is small, and $G_v$ represents the velocity feedback gain. Moreover, $B_{21}$ represents model gain.

$$L=\left[-b_1\cdot G_v-G_v-2\cdot b_1\cdot\frac{1}{B_{21}}\right] \tag{2}$$

The design parameters in this control system are the gain vector 150 (*k*) multiplied by the output of the phase compensator 120 and the velocity feedback gain $G_v$ determining the state feedback gain L in positioning.

Accordingly, next, the methods for setting the gain vector 150 (*k*) and the velocity feedback gain $G_v$ will be explained.

The model is calculated by, for example, 1/r of the cycle Ts in which the position error can be observed, and therefore, the model can be shown by the following equation.

$$\begin{cases} x(k,i+1)=Ax(k,i)+Bu(k,i) \\ y(k,i)=Cx(k,i) \end{cases} \tag{3}$$

The model in the seek is represented by the double integral, and therefore, is as the following equation.

$$A=\begin{bmatrix}1 & 2\\ 0 & 1\end{bmatrix} \quad B=\begin{bmatrix}0\\ B_{21}\end{bmatrix} \quad C=[1\ \ 0] \tag{4}$$

Figure 6:
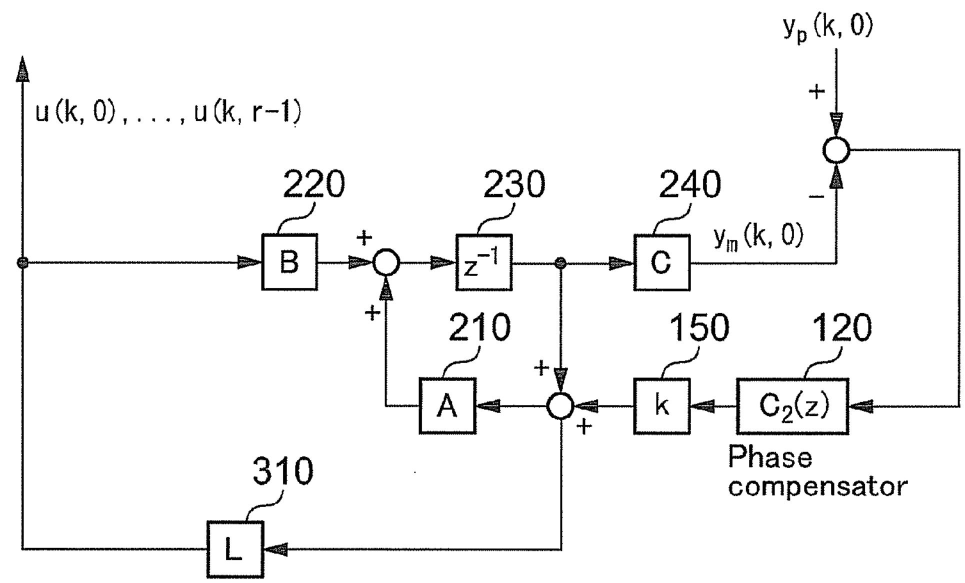
FIG. 6 is a block diagram showing from the head position to the velocity feedback output.

Moreover, the output of the phase lead compensator 120 is output by the period Ts, the model is provided through the zeroth-order holder 420 having a period Ts. In this case, the part surrounded by dashed line in FIG. 2 is shown in FIG. 6, the head position to the velocity feedback controller 300 can be represented by the following equation.

$$\begin{bmatrix}x(k+1,0)\\ x_c(k+1,0)\end{bmatrix}=\begin{bmatrix}(A+BL)^r-H_rD_cC & H_rC_c\\ -B_cC & A_c\end{bmatrix}\begin{bmatrix}x(k,0)\\ x_c(k,0)\end{bmatrix}+\begin{bmatrix}H_rD_c\\ B_c\end{bmatrix}y_p(k,0) \tag{5}$$

-continued $$\begin{bmatrix} u(k,0) \\ u(k,1) \\ u(k,2) \\ \vdots \\ u(k,r-1) \end{bmatrix} = \begin{bmatrix} L - LKD_cC & LKC_c \\ L(A+BL) - LH_1D_cC - LKD_cC & LH_1C_c + LKC_c \\ L(A+BL)^2 - LH_2D_cC - LKD_cC & LH_2C_c + LKC_c \\ \vdots & \vdots \\ L(A+BL)^{r-1} - LH_{r-1}D_cC - LKD_cC & LH_{r-1}C_c + LKC_c \end{bmatrix} \begin{bmatrix} x(k,0) \\ x_c(k,0) \end{bmatrix} + \begin{bmatrix} LKD_c \\ LH_1D_c + LKD_c \\ LH_2D_c + LKD_c \\ \vdots \\ LH_{r-1}D_c + LKD_c \end{bmatrix} y_p(k,0)$$

Here, $H_r$ is represented by the following equation.

$$H_r = \sum_{i=1}^{r} (A+BL)^i k \tag{6}$$

From the equation 5, if the following equation is held, the head position $y_p(k,0)$ to u(k, 0) . . . u(k, r−1) becomes equal to the negative phase lead compensator 120 ($-C_2(z)$). Here, λ represents the eigen value of the matrix (A+BL)

$$(A+BL)k=\lambda k=0 \tag{7}$$

$$Lk=-1 \tag{8}$$

If the equation 7 is held, $H_r$ is as follows.

$$H_r = \sum_{i=1}^{r} (A+BL)^i k = 0 \tag{9}$$

If the equation 8 and the equation 7 are held, the equation 5 becomes as the follow equation.

$$\begin{bmatrix} x(k+1,0) \\ x_c(k+1,0) \end{bmatrix} = \begin{bmatrix} (A+BL)^r & 0 \\ -B_c & A_c \end{bmatrix} \begin{bmatrix} x(k,0) \\ x_c(k,0) \end{bmatrix} + \begin{bmatrix} 0 \\ B_c \end{bmatrix} y_p(k,0) \tag{10}$$

$$\begin{bmatrix} u(k,0) \\ u(k,1) \\ u(k,2) \\ \vdots \\ u(k,r-1) \end{bmatrix} = \begin{bmatrix} L + D_cC & -C_c \\ L(A+BL) + D_cC & -C_c \\ L(A+BL)^2 + D_cC & -C_c \\ \vdots & \vdots \\ L(A+BL)^{r-1} + D_cC & -C_c \end{bmatrix} \begin{bmatrix} x(k,0) \\ x_c(k,0) \end{bmatrix} + \begin{bmatrix} -D_c \\ -D_c \\ -D_c \\ \vdots \\ -D_c \end{bmatrix} y_p(k,0)$$

From these things, if the equation 7 is held, the inclination of the target velocity curve becomes $b_1$, and the mode state x (k, 0) becomes approximated to "0" by the state feedback gain 310 (L). And, because x(k, 0)=0 in the positioning state, the characteristics $y_p(k,0)$ to u(k, 0) . . . u(k, r−1) become equal to the negative phase lead compensator 120 ($-C_2(z)$). From above, the velocity feedback gain Gv is set so that (A+BL) has an eigenvalue of "0", and an eigenvector with respect to the eigenvalue of "0" is set to k, and the gain of k is determined so that Lk=−1.

From the equations 2 and 4, (A+BL) is as the following equation.

$$A + BL = \begin{bmatrix} 1 & 2 \\ -B_{21} \cdot b_1 \cdot G_v & 1 + (-B_{21} \cdot G_v - 2 \cdot b_1) \end{bmatrix} \tag{11}$$

From this, in order for (A+BL) to have the eigenvalue of "0", the velocity feedback gain $G_v$ has to satisfy equation 12. Therefore, the velocity feedback gain $G_v$ is as equation 13. That is, the velocity feedback gain $G_v$ becomes an inverse number of the model gain $B_{21}$.

$$1-B_{21}\cdot G_v-2\cdot b_1+2\cdot B_{21}\cdot b_1\cdot G_v=0 \tag{12}$$

$$G_v = \frac{1}{B_{21}} \tag{13}$$

The $G_v$ represented as the equation 13 is set to $G_{v\_opt}$.

Moreover, since it is necessary that (A+BL) has to be stable, the other one eigenvalue is required to be less than "1". Therefore, it is necessary that equation 14 is held. When the relation of the equation 13 is substituted for $G_v$, the inclination $b_1$ of the target velocity curve in positioning is required to satisfy equation 15.

$$|2-B_{21}\cdot G_v-2\cdot b_1|<1 \tag{14}$$

$$0<b_1<1 \tag{15}$$

If the inclination of the target velocity curve satisfying equation 14 is set, (A+BL) can be stable and $G_{v\_opt}$ that can set one of the eigenvalues to be "0" can be obtained. Thereby, if the eigenvector to the eigenvalue "0" is selected as the gain vector k, the equation 7 is held. And, if gain of the gain vector k is set so that Lk=−1, $y_p(k, 0)$ to u(k, 0) . . . u(k, r−1) can be set to the negative phase lead compensator 120 ($-C_2(z)$). Thereby, in positioning, the system can have the same feedback frequency characteristics as the comparative example such as shown in FIG. 4, and the positioning accuracy that is the same accuracy when the position error feedback control system 100 (C(z)) is used can be achieved.

Figure 7:
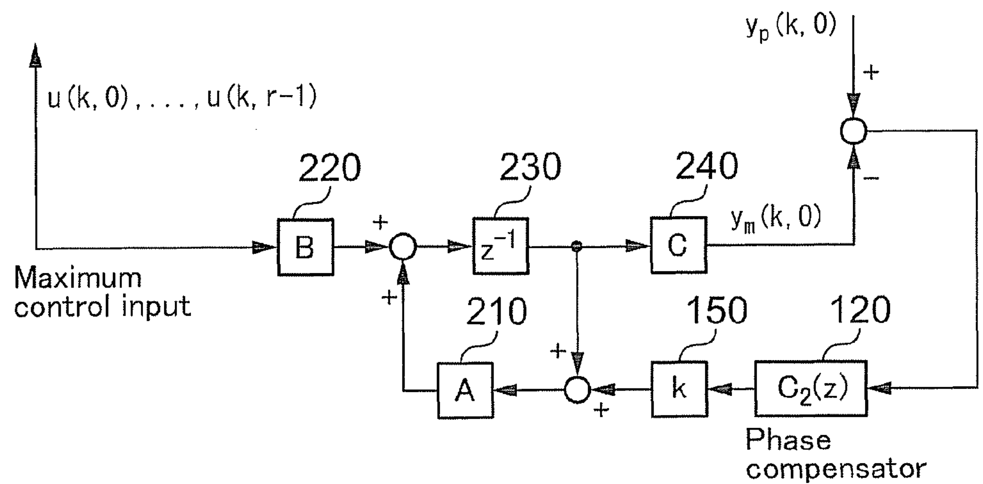
FIG. 7 is a block diagram showing a model-side control system at the saturation.

On the other hand, term of the seek is thought to be divided into two. One is a zone in which the control command is saturated in accelerating, and the other is a deaccelerating zone in which the inclination of the target velocity curve becomes $b_1$. In accelerating in which the control command is saturated, FIG. 6 becomes the same as FIG. 7. As shown in FIG. 7, it can be seen that a monitoring device is composed at the saturation and the state of the model is approximated to the state of the VCM 13. Thereby, degradation of compliance performance due to the saturation of the control command is avoided. In this case, error equation of the monitoring device is as the following equation.

$$\begin{bmatrix} \bar{e}(k+1,0) \\ x_c(k+1,0) \end{bmatrix} = \begin{bmatrix} A^r - M_r D_c C & -M_r C_c \\ B_c C & A_c \end{bmatrix} \begin{bmatrix} \bar{e}(k,0) \\ x_c(k,0) \end{bmatrix} \tag{16}$$

$$M_r = \sum_{i=1}^{r} A^i k$$

Figure 8:
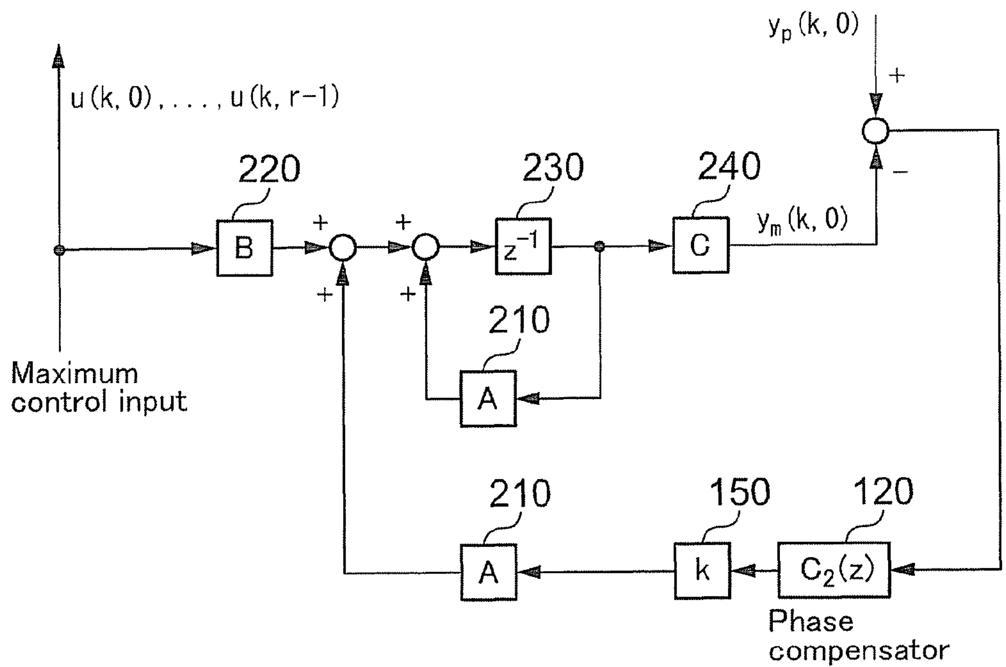
FIG. 8 is a block diagram showing a model-side control system at the saturation.
Figure 9:
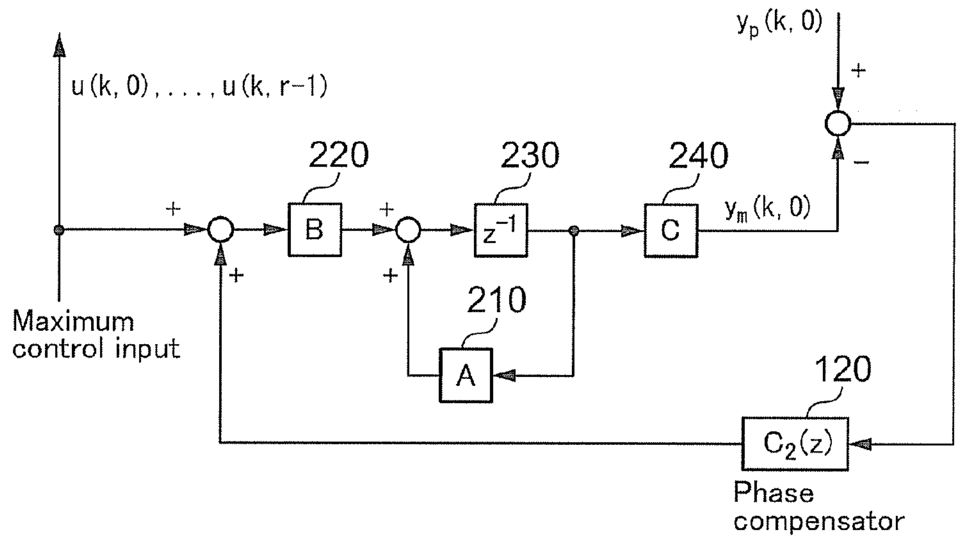
FIG. 9 is a block diagram showing a model-side control system at the saturation.

Moreover, the model-side control system shown in FIG. 7 can be converted as FIG. 8. The gain vector k is selected so that the equations 7 and 8 are held, and therefore, the relation of the following equation is held.

$$Ak=-BLk=B \tag{17}$$

Thereby, the model-side control system shown in FIG. 8 can be converted as FIG. 8. Moreover, the equation 16 becomes as the following equation.

$$\begin{bmatrix} \bar{e}(k+1,0) \\ x_c(k+1,0) \end{bmatrix} = \begin{bmatrix} A^r - N_r D_c C & -N_r C_c \\ B_c C & A_c \end{bmatrix} \begin{bmatrix} \bar{e}(k,0) \\ x_c(k,0) \end{bmatrix} \tag{18}$$

$$N_r = \sum_{i=0}^{r-1} A^i B$$

Next, the feedback control system when the control command is saturated will be thought.

Figure 10:
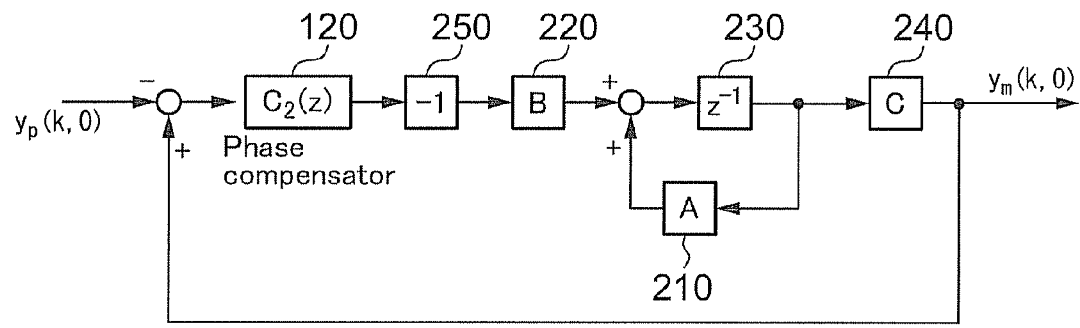
FIG. 10 is a block diagram showing an equivalent conversion of a model-side control system at the saturation.

FIG. 10 is a block diagram showing an equivalent conversion of the model-side control system at the saturation.

A transfer function from $y_p(k, 0)$ to $y_m(k, 0)$ is calculated to be as the following equation.

$$\begin{bmatrix} x(k+1,0) \\ x_c(k+1,0) \end{bmatrix} = \begin{bmatrix} A^r - N_r D_c C & -N_r C_c \\ B_c C & A_c \end{bmatrix} \begin{bmatrix} x(k,0) \\ x_c(k,0) \end{bmatrix} + \begin{bmatrix} N_r D_c \\ -B_c \end{bmatrix} y_p(k,0) \tag{19}$$

$$y_m(k,0) = \begin{bmatrix} C & 0 \end{bmatrix} \begin{bmatrix} x(k,0) \\ x_c(,0) \end{bmatrix}$$

$$N_r = \sum_{i=0}^{r-1} A^i B$$

Thereby, it can be seen that if the phase lead compensator 120 is designed so that the feedback control system shown in FIG. 10 is stable, the monitoring device is stable in accelerating in which the control command is saturated. Because the model is near the characteristic of the control target, if the phase lead compensator 120 is designed so that the control target is stable, the feedback control system shown in FIG. 10 is also stable.

Figure 11:
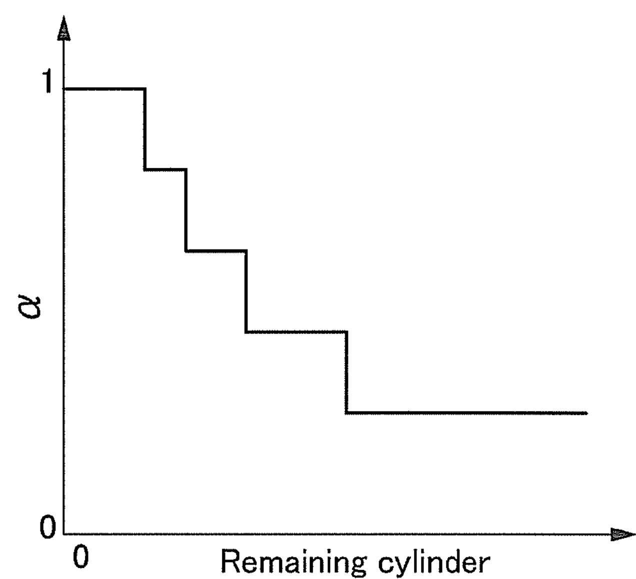
FIG. 11 is a graph view showing switching of the velocity feedback gain.

When the saturation state is finished and the state become in the deaccelerating state, the system becomes the same as a general two-freedom-degree control system. This is because $G_{v\_opt}$ and k calculated so that the frequency characteristic in positioning becomes the same as the frequency characteristic of the original positioning control system are used. When the residual distance to the target position is large, the seek velocity is high, and therefore, if the structure is the two-freedom-degree control system, the control command becomes vibratory due to a position detection error, and the control performance becomes degraded by mechanical resonance excitation of the actuator 13. Accordingly, by setting $G_v$ to be as the following equation, α in the following equation is used so as to be switched to be step-like as shown in FIG. 11.

$$G_v=\alpha \cdot G_{v\_opt} \tag{20}$$

When the residual distance to the target position is large, $G_v$ is set to be smaller than $G_{v\_opt}$, and $G_v$ is set to become $G_{v\_opt}$ when the residual distance becomes smaller than the distance in which the inclination of the target velocity curve becomes $b_1$. Thereby, effects of the shape forming of the control command in deaccelerating and the position detection error are reduced. In this case, the eigenvalues of (A+BL) are calculated to be as follows.

$$z = \frac{(2 + B_{21} L_2) \pm \sqrt{B_{21}^2 L_2^2 + 8 B_{21} L_1}}{2} \tag{21}$$

Here, $L_1$ and $L_2$ are as equation 22. Therefore, the eigenvalues are calculated as equation 23. "b" in the equations represents inclination of the target velocity curve.

$$L_1=-b \cdot \alpha \cdot G_{v\_opt}$$

$$L_2=(-\alpha-2b)G_{v\_opt} \tag{22}$$

$$\lambda_1=(1-2b)$$

$$\lambda_2=(1-\alpha) \tag{23}$$

The system has to be stable in the seek and therefore it is necessary that the absolute values of $\lambda_1$ and $\lambda_2$ are smaller than "1". Thereby, it is seen that the following condition has to be held.

$$0<b<1$$

$$0<\alpha<2 \tag{24}$$

In the seek, a number of 1 or less is selected as α, and therefore, it can be seen to be sufficient that the number of 0 to 1 is selected as α. However, if α is set to be too small, the seek comes not to run, and therefore, α becomes set to be in the range of 0 to 1 while watching the seek time and the degree of compliance of the model velocity to the target velocity. Moreover, the inclination of the target velocity curve when the residual distance to the target position is large is generally smaller than the inclination $b_1$ in the vicinity of the residual distance of 0, and the following equation is held.

$$0<b \leqq b_1 \tag{25}$$

Therefore, when $b_1$ satisfies the equation 14, the eigenvalues become certainly in a unit circle. However, this condition stabilizes (A+BL) but does not always stabilize the control system shown in FIG. 2. Ultimately, the equation 5 is calculated from the inclination b of the target velocity curve obtained from the residual distance for changing α and from α, and thereby, it is necessary to confirm that the control system shown in FIG. 2 becomes stable.

Hereinafter, one example of the case of two times multirate in which the model is calculated twice in the sample cycle Ts by r=2 is shown. The phase lead compensator 120 ($C_2(z)$), the VCM 13 model, and the state feedback gain 310 (L) will be shown in equations 26, 27, and 28, respectively.

$$C_2(z) = \frac{1.6\times10^{-1}\cdot z^2 - 2.5\times10^{-1}\cdot z + 1.0\times10^{-1}}{z^2 - 8.3\times10^{-2}\cdot z - 3.7\times10^{-1}} \quad (26)$$

$$A = \begin{bmatrix} 1 & 2 \\ 0 & 1 \end{bmatrix} \quad (27)$$

$$B = \begin{bmatrix} 0 \\ 8.9\times10^{-1} \end{bmatrix}$$

$$C = [1 \;\; 0]$$

$$D = 0$$

Thereby, the velocity feedback gain Gv becomes "1.12" and the state feedback gain L becomes as the following equation.

$$L=[-7.4\times10^{-2} -1.27] \quad (28)$$

Thereby, the eigenvalue of (A+BL) is as the following equation.

$$\lambda_1=0, \lambda_2=8.68\times10^{-1} \quad (29)$$

The eigenvector with respect to $\lambda_1$ is as the following equation.

$$V = \begin{bmatrix} -8.94\times10^{-1} \\ 4.47\times10^{-1} \end{bmatrix} \quad (30)$$

In this case, the value of LV is "−5.02" and therefore the value that is V divided by 5.02 is set to k as the following equation.

$$k = V\cdot\frac{1}{5.02} = \begin{bmatrix} -1.78 \\ 8.90\times10^{-1} \end{bmatrix} \quad (31)$$

As described above, through the gain vector 150 (*k*) in which a constant is multiplied with the eigenvector with respect to the eigenvalue "0" of the matrix (A+BL), the state of the model-side control system 200 is provided with the output of the phase lead compensator 120, and thereby, the feedback characteristic in positioning indicates the same feedback frequency characteristic as the comparative example illustratively shown in FIG. 4, and the positioning accuracy is not degraded.

Next, experimental results and simulation results in the seek control system according to the comparative example shown in FIG. 4 will be explained with reference to drawings.

Figure 12:
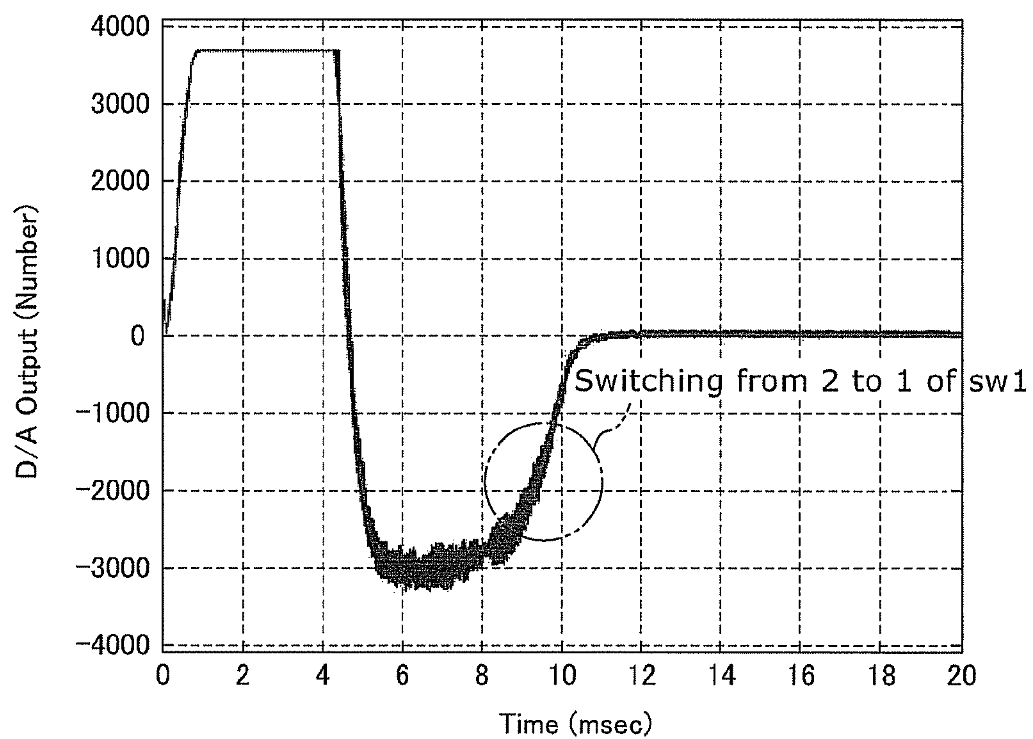
FIG. 12 is a graph view (experiment result) showing the control command in performing the seek to the direction that the external force is small in the comparative example.

FIG. 12 is a graph view (experiment result) showing the control command in performing the seek to the direction that the external force is small in the comparative example. The items of the horizontal axis and the vertical axis of the graph view are the same as the graph view shown in FIG. 5.

The seek control system according to the comparative example does not generate discontinuous control command in performing the seek to the direction that the external force is small as shown in FIG. 12. That is, the seek control system according to the comparative example has no problem when the external force is small because the transient response by switching of the switch sw1 is very small. On the other hand, as described above, in performing the seek to the direction that the external force such as magnet latch force is large, discontinuous control command value is generated in switching of the switch sw1 (see, FIG. 5).

Furthermore, for specifically investigating the response with respect to the external force, simulations are performed with respect to the control commands when the external force acting on VCM 13 is changed.

Figure 13:
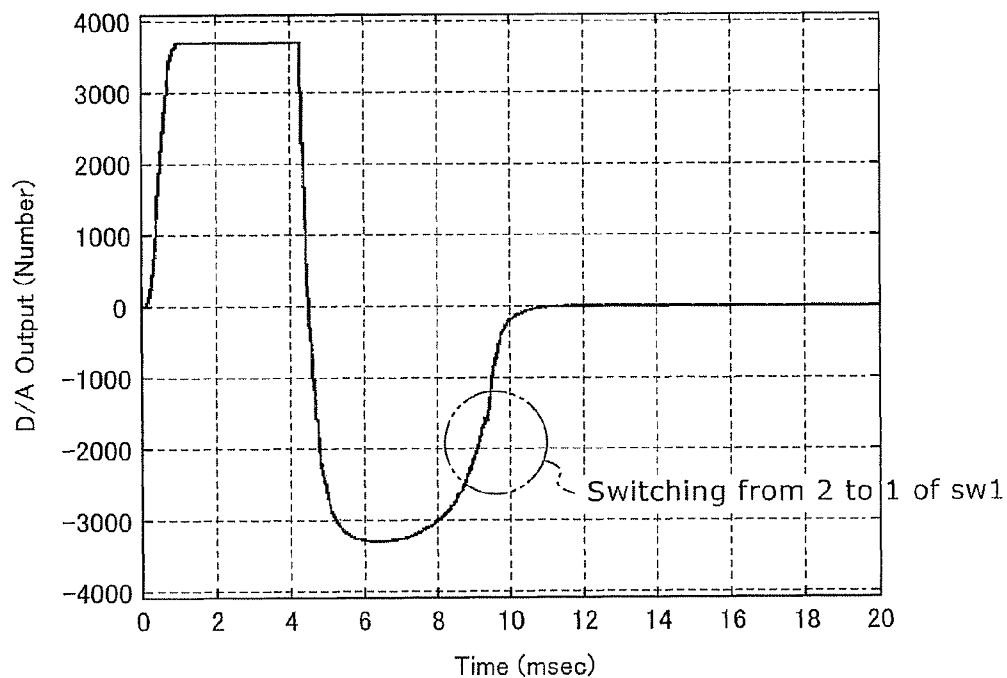
FIG. 13 is a simulation result when the external force does not act in the comparative example.
Figure 14:
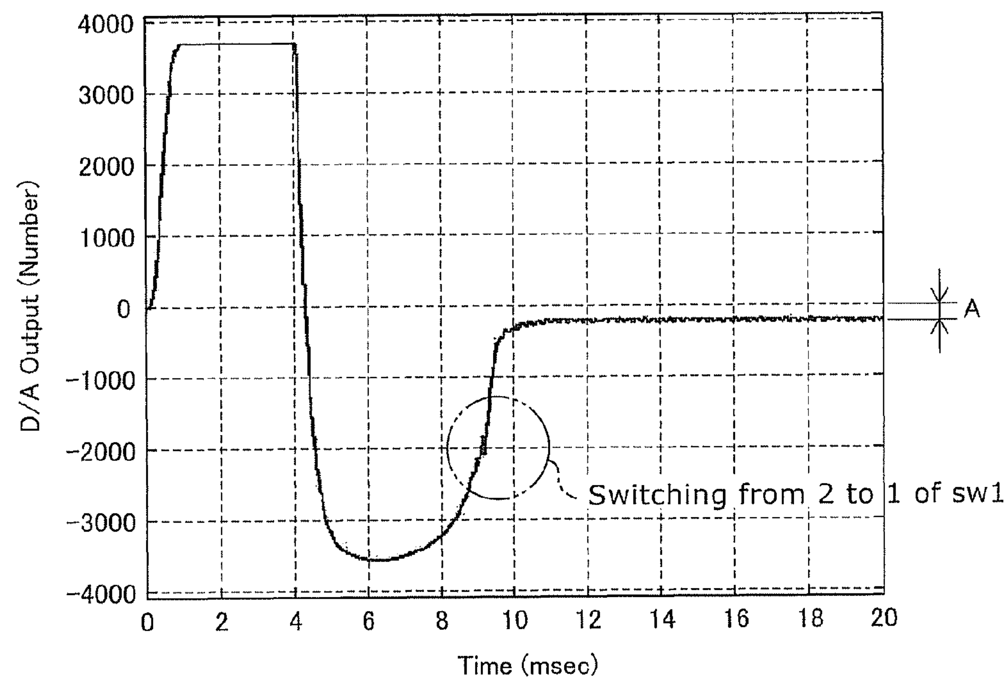
FIG. 14 is a simulation result when the external force of 5% of the maximum control command value acts in the comparative example.

FIG. 13 is a simulation result when the external force does not act in the comparative example. Moreover, FIG. 14 is a simulation result when the external force of 5% of the maximum control command value acts in the comparative example.

Figure 15:
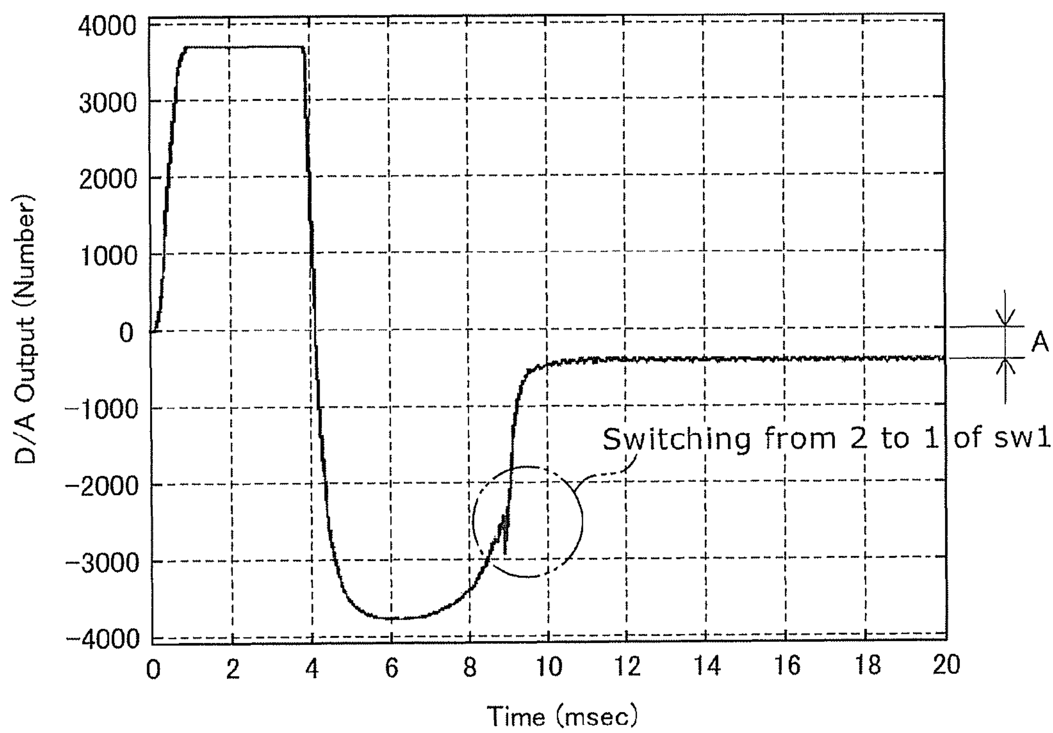
FIG. 15 is a simulation result when the external force of 10% of the maximum control command value acts in the comparative example.

Moreover, FIG. 15 is a simulation result when the external force of 10% of the maximum control command value acts in the comparative example.

Figure 16:
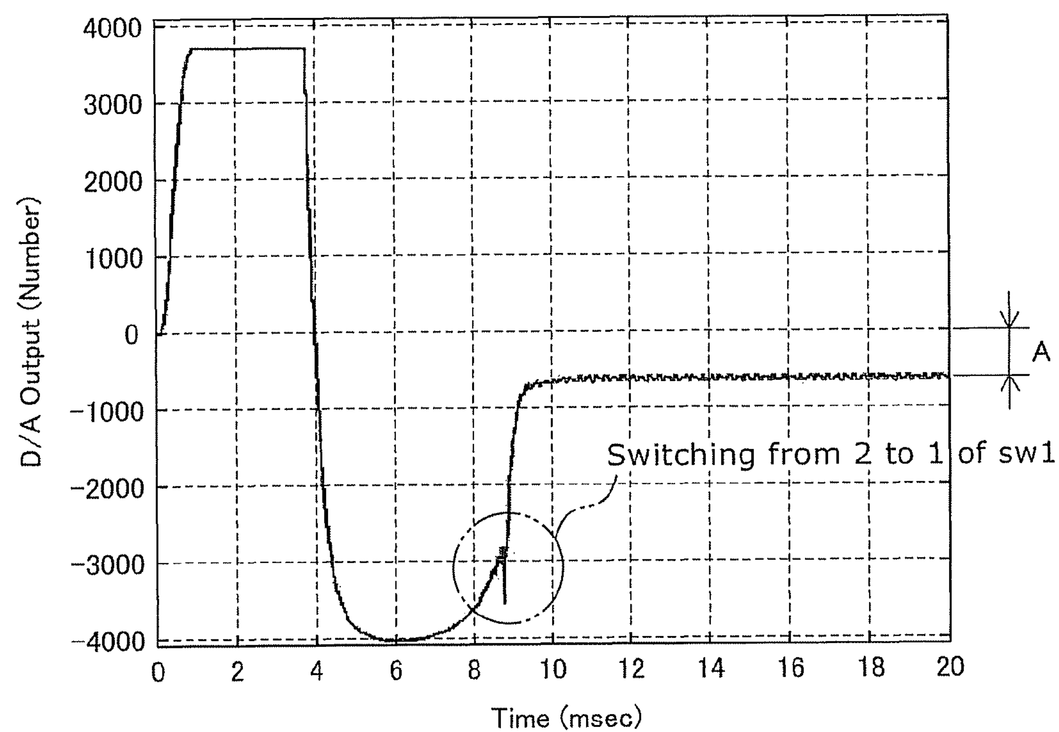
FIG. 16 is a simulation result when the external force of 15% of the maximum control command value acts in the comparative example.

Moreover, FIG. 16 is a simulation result when the external force of 15% of the maximum control command value acts in the comparative example.

As shown in FIGS. 13 to 16, it can be seen that as the external force acting on VCM 13 is larger, the transient response in switching of the switch is larger. From these things, the method for adding the output of the position error feedback control system 100 to the input side of the model like the seek control system according to the comparative example has very little transient response by switching of the switch when the external force is small, and therefore, there is no problem. On the other hand, it is seen that, in the seek under such an environment as the large external force is acting on the arm, the transient response comes to appear in the control command and the robust property with respect to the external for force is low.

Precipitous transient response of the control command excites mechanical resonance to cause fluctuation in settling. Therefore, the number of write-protect times becomes large to degrade the performance. In this seek control system according to the comparative example, it is conceived that the method for solving such a problem includes a method of providing a preliminarily measured external force as a table and adding the table to the control command added to VCM 13 in the control. However, it is difficult from the aspect of production cost that the external force is preliminarily measured by thin intervals in the track direction and provided as a table. Accordingly, for solving the above-described problem of the seek control system according to the comparative example, it is preferable that the control system having the same control structure is composed in the seek control and the positioning control, similarly to the control system according to the embodiment.

Accordingly, next, for confirming the effectiveness of the control system according to the embodiment, the simulation result and the experiment result in the seek when the calculated most suitable gain vector k is used will be explained with reference to drawings.

Figure 17:
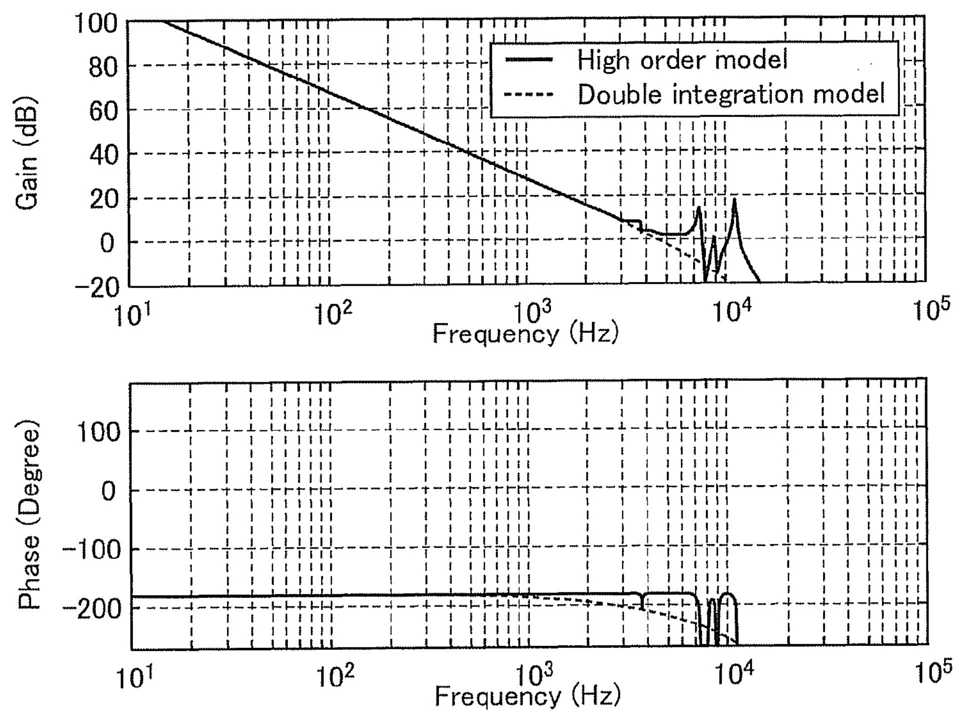
FIG. 17 is a graph view showing a characteristic of VCM model used in the simulation.

FIG. 17 is a graph view showing a characteristic of a VCM model used in the simulation.

Figure 18:
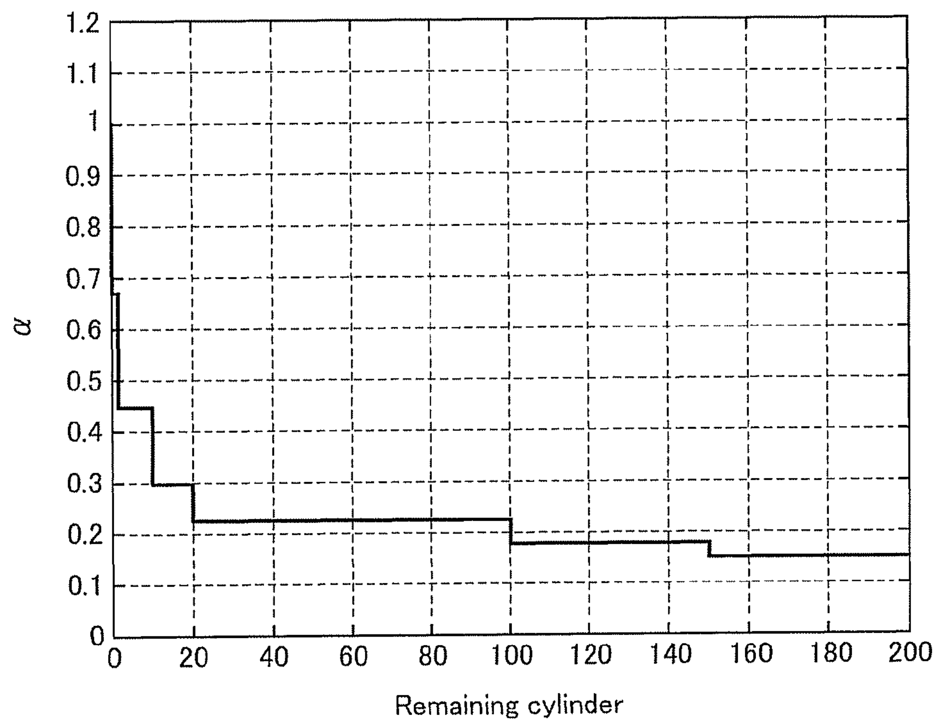
FIG. 18 is a graph view showing the switching condition of the velocity feedback gain.

Moreover, FIG. 18 is a graph view showing the switching condition of the velocity feedback gain.

With respect to the switching condition of the VCM model and the velocity feedback gain, the control system according to the embodiment and the control system according to the comparative example are used, and the control command in performing the seek by the same distance and the head position are subjected to simulation. The disturbance measured in the actual equipment is modeled and added thereto. Moreover, the same velocity feedback system is used in the control system according to the embodiment and in the control system according to the comparative example.

Figure 19:
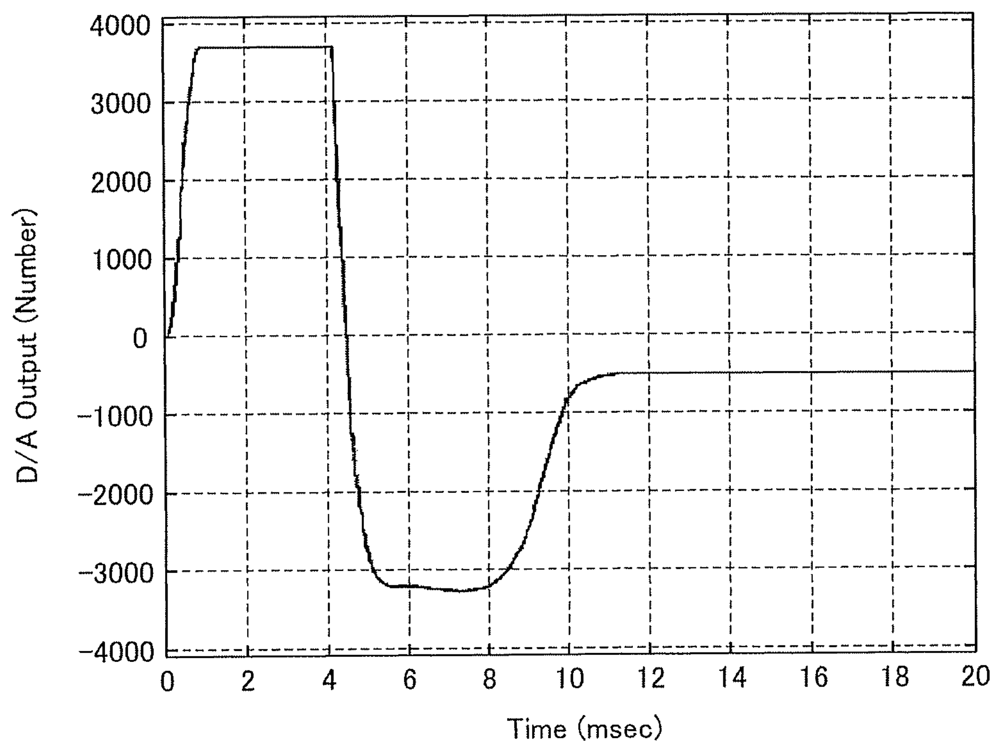
FIG. 19 is a simulation result of the control command of the control system according to the embodiment.

FIG. 19 is a simulation result of the control command of the control system according to the embodiment.

Figure 20:
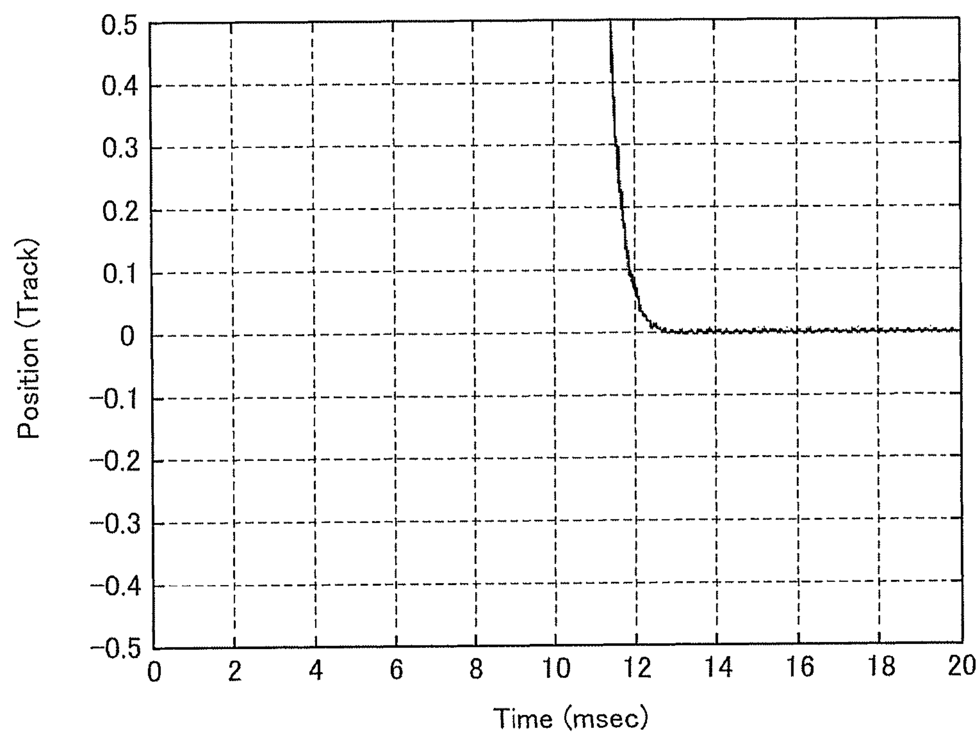
FIG. 20 is a simulation result of the head position of the control system according to the embodiment.

Moreover, FIG. 20 is a simulation result of the head position of the control system according to the embodiment.

The horizontal axis of the graph view shown in FIG. 19 represents time (millisecond) and the vertical axis represents the control command value provided to the D/A converter 19. Moreover, the horizontal axis of the graph view shown in FIG. 20 represents time (millisecond) and the vertical axis represents head position (track) with respect to the target position.

As shown in FIG. 19, it can be seen that in the control system according to this embodiment, the transient response is not caused because switching of the control structure is not required. Moreover, as shown in FIG. 20, in the control system according to the embodiment, smooth control command having no transient response and therefore the mechanical resonance of VCM 13 is not excited. Therefore, the vibration of the head position in settling is small. That is, the head reaches the target position with low vibration.

Figure 21:
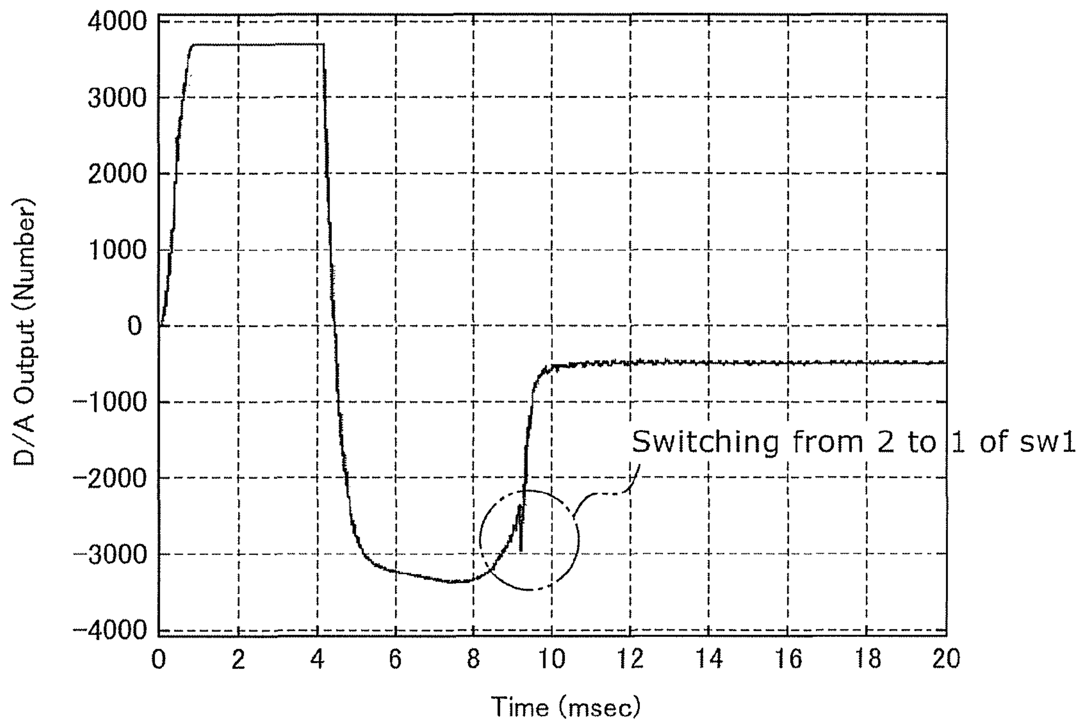
FIG. 21 is a simulation result of the control command of the control system according to the comparative example.

FIG. 21 is a simulation result of the control command of the control system according to the comparative example.

Figure 22:
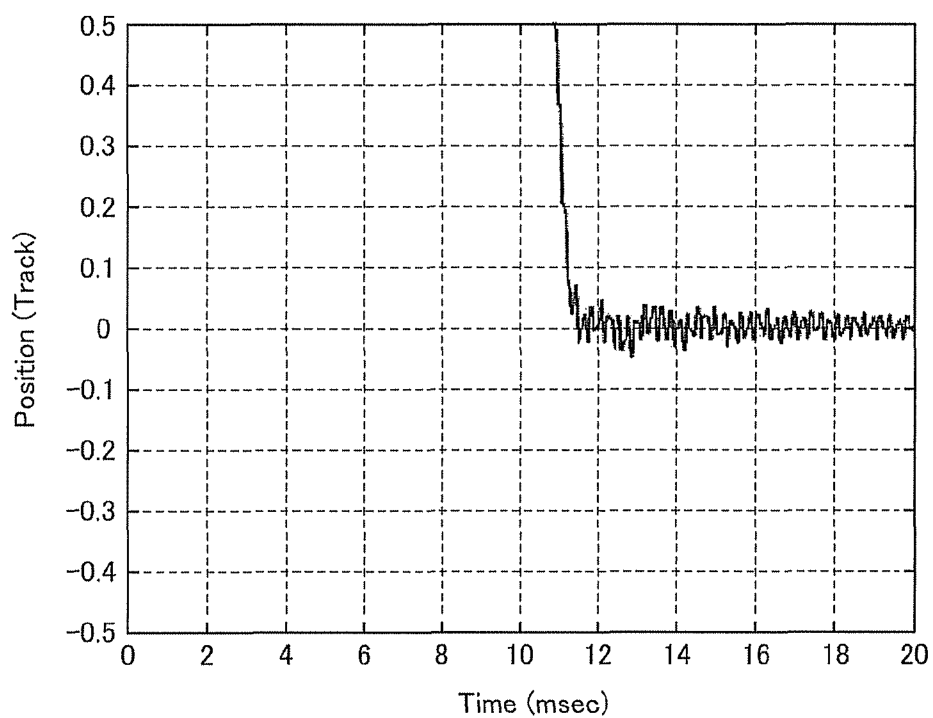
FIG. 22 is a simulation result of the head position of the control system according to the comparative example.

Moreover, FIG. 22 is a simulation result of the head position of the control system according to the comparative example. The items of the horizontal axis and the vertical axis of the graph view shown in FIGS. 21 and 22 are the same as the items of the horizontal axis and the vertical axis of the graph view shown in FIGS. 19 and 20.

As shown in FIG. 21, in the control system according to the comparative example, the model-side control system 200 is updated by using positioning controller in the seek first half, and the system is switched to a general two-freedom-degree control system near the target position, and therefore, discontinuous control command value is caused in switching. Moreover, as shown in FIG. 22, in the control system according to the comparative example, because the discontinuous control command value is caused, the mechanical resonance of VCM 13 is excited. Therefore, the head position is vibrating in settling. As described above, when the head position vibrates in settling, the timing of occurrence of write enable is delayed to degrade the performance.

Figure 23:
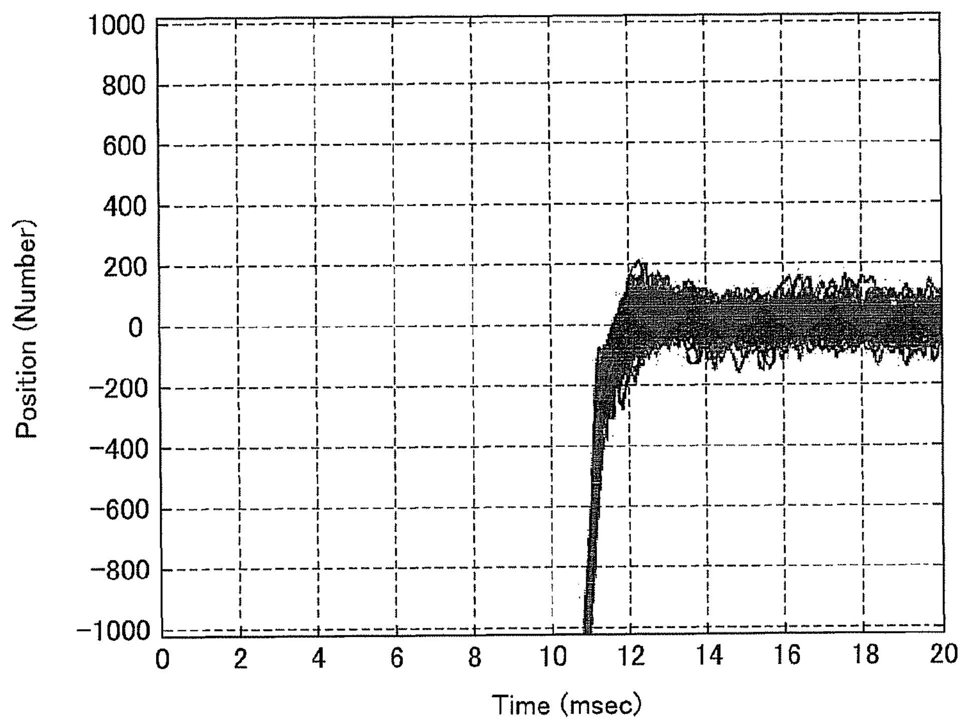
FIG. 23 is an experiment result of the head position according to the embodiment.

FIG. 23 is an experiment result of the head position according to the embodiment.

Moreover, the experiment result of the control command of the control system according to the embodiment is as shown in above-described FIG. 3.

As shown in FIGS. 23 and 3, in the control system according to the embodiment, switching of the control structure is not required in the same manner as the simulation result (see, FIGS. 19 and 20), and therefore, the transient response is not caused. Moreover, smooth control command having no transient response is generated, and therefore, mechanical resonance of VCM 13 is not excited. Therefore, the vibration of the head position in settling is small. That is, the head reaches the target position with low vibration.

Figure 24:
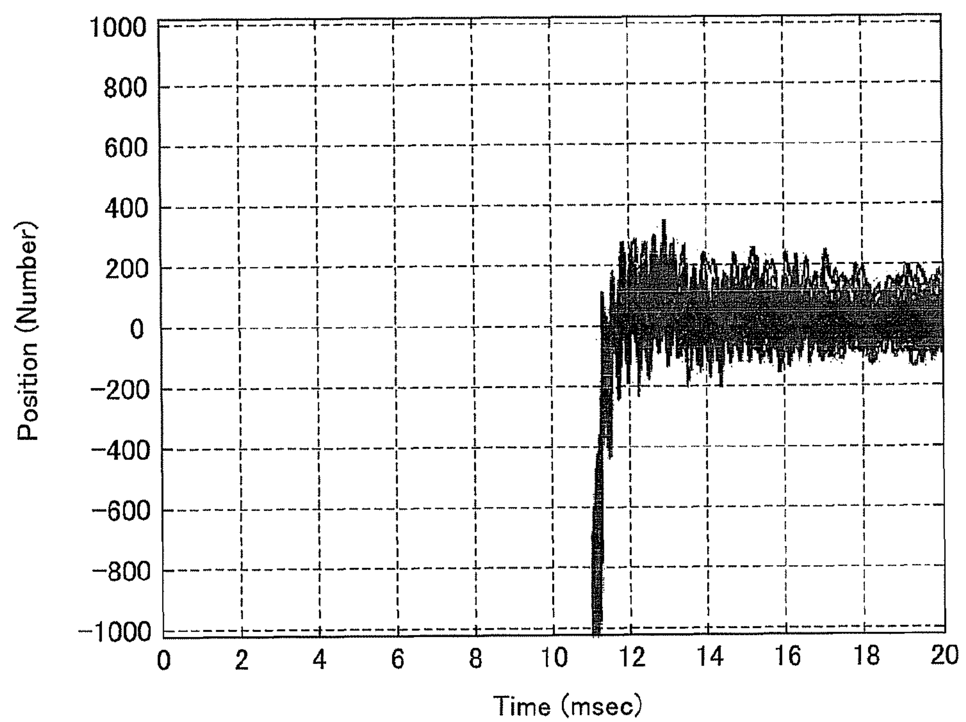
FIG. 24 is an experiment result of the head position according to the comparative example.

FIG. 24 is an experiment result of the head position according to the comparative example.

Moreover, the experiment result of the control command of the control system according to the comparative example is as shown in above-described FIG. 5.

As shown in FIGS. 24 and 5, in the control system according to the comparative example, discontinuous control command value is generated in switching of the switch in the same manner as the simulation result (see, FIGS. 21 and 22). Moreover, because the discontinuous control command value is caused, the mechanical resonance of VCM 13 is excited. Therefore, the head position vibrates in settling.

Figure 25:
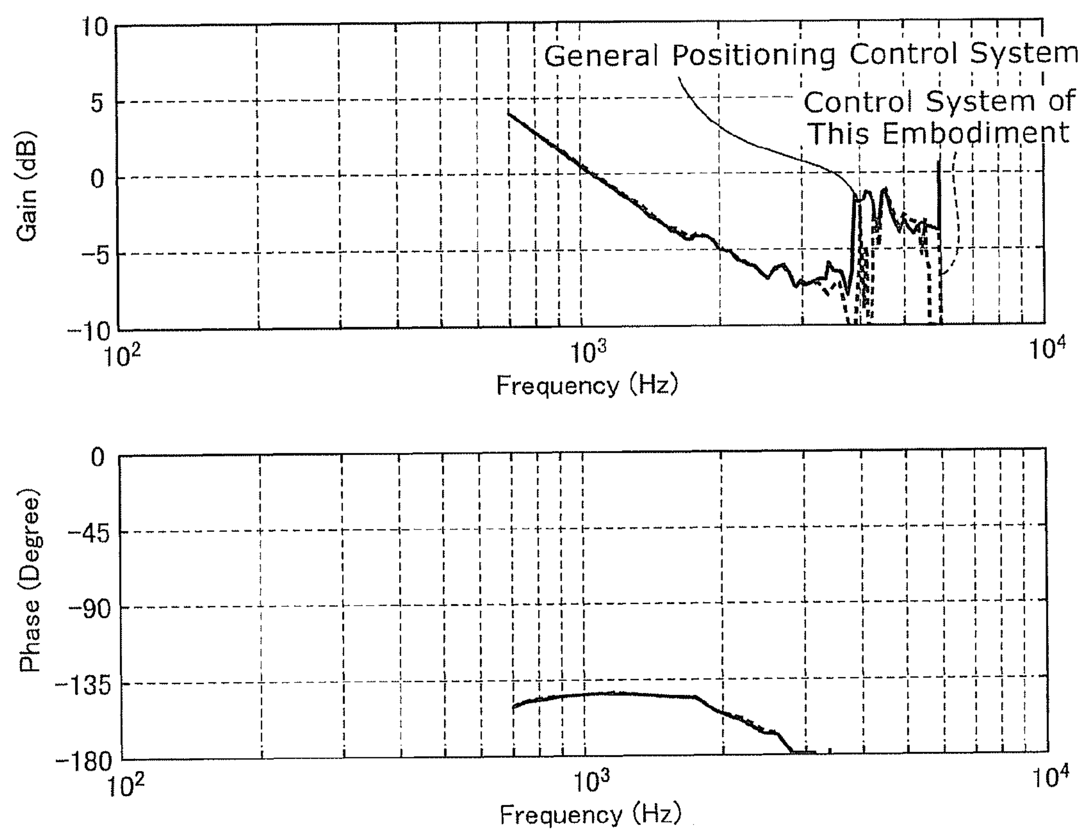
FIG. 25 is a result of measuring the open roof characteristic in positioning.

For each of the parameters in the experiments, each of the same parameters as the simulation is used. Moreover, for clarifying the difference, in FIGS. 22 and 23, the experiment result performed so that a notch filter (not shown) provided after the zeroth-order holder 420 is unfastened is shown. Furthermore, it has been known that also in the control in positioning, the same frequency characteristic as the positioning control by a general control in the vicinity of the cross frequency can be realized. The result of measuring the open roof characteristic in positioning is as shown in FIG. 25.

As described above, according to the embodiment, in the seek control and the positioning control, the output of the integrator 110 is input to the control target (VCM 13). Similarly, in the seek control and the positioning control, the output of the phase lead compensator 120 is input to the model-side control system 200 to update the model. Thereby, in the seek control and positioning control, the control system having the same structure can be composed, and therefore, the transient response of the control command by switching of the control structure can be reduced. That is, the seek control system that is robust to the external force can be composed.

As described above, the embodiment of the invention has been explained. However, the invention is not limited to these descriptions. The above-described embodiment whose design is appropriately modified by those skilled in the art is included in the scope of the invention as long as having the characteristic of the invention. For example, each of the components of the control system according to the embodiment, the arrangement thereof, and so forth are not limited to the exemplified ones but can be appropriately modified.

Moreover, each of the components of each of the above-described embodiments can be combined as long as technically possible, and the combinations are also included in the scope of the invention as long as including the characteristics of the invention.

The invention claimed is:

1. A magnetic disk apparatus comprising:

a driving section for moving a magnetic head recoding and reproducing information in a magnetic disk; and a controller for controlling the driving section, the controller including:

a position-error feedback control system having an integrator and a phase lead compensator and obtaining a position command based on difference between target position and detection position of the magnetic head to perform feedback control of the driving section; and a two-freedom-degree control system inputting a target move distance of the magnetic head and outputting a current command to the driving section by using a mathematic model of the driving section, the controller providing the driving section with an output of the integrator and therewith updating the mathematical model by using an output of the phase lead compensator, in each of the times of positioning control and seek of the magnetic head, a velocity feedback gain Gv determining a state in the positioning control being set so that a matrix $$A + BL = \begin{bmatrix} 1 & 2 \\ -B_{21} \cdot b_1 \cdot G_v & 1 + (-B_{21} \cdot G_v - 2 \cdot b_1) \end{bmatrix}$$

have an eigenvalue of zero, where b1 represents inclination of a target velocity curve, B21 represents a model gain, $$A = \begin{bmatrix} 1 & 2 \\ 0 & 1 \end{bmatrix}$$

$$B = \begin{bmatrix} 0 \\ B_{21} \end{bmatrix}$$

and $$L = \left[ -b_1 \cdot G_v - G_v - 2 \cdot b_1 \cdot \frac{1}{B_{21}} \right].$$

2. A magnetic disk apparatus comprising:

a driving section for moving a magnetic head recoding and reproducing information in a magnetic disk; and a controller for controlling the driving section, the controller including:

a position-error feedback control system having an integrator and a phase lead compensator and obtaining a position command based on difference between target position and detection position of the magnetic head to perform feedback control of the driving section; and a two-freedom-degree control system inputting a target move distance of the magnetic head and outputting a current command to the driving section by using a mathematic model of the driving section, the controller providing the driving section with an output of the integrator and therewith updating the mathematical model by using an output of the phase lead compensator, in each of the times of positioning control and seek of the magnetic head, a velocity feedback gain determining a state in the positioning control being an inverse number of a model gain of the mathematical model.

3. A magnetic disk apparatus comprising:

a driving section for moving a magnetic head recoding and reproducing information in a magnetic disk; and a controller for controlling the driving section, the controller including:

a position-error feedback control system having an integrator and a phase lead compensator and obtaining a position command based on difference between target position and detection position of the magnetic head to perform feedback control of the driving section; and a two-freedom-degree control system inputting a target move distance of the magnetic head and outputting a current command to the driving section by using a mathematic model of the driving section, the controller providing the driving section with an output of the integrator and therewith updating the mathematical model by using an output of the phase lead compensator, in each of the times of positioning control and seek of the magnetic head, and providing the mathematical model with the output of the phase lead compensator, through a gain vector, the gain vector being a gain vector in which an eigenvector for an eigenvalue of zero of a matrix $$A + BL = \begin{bmatrix} 1 & 2 \\ -B_{21} \cdot b_1 \cdot G_v & 1 + (-B_{21} \cdot G_v - 2 \cdot b_1) \end{bmatrix}$$

is multiplied by a constant, where b1 represents inclination of a target velocity curve, Gv represents a velocity feedback gain, B21 represents model gain, $$A = \begin{bmatrix} 1 & 2 \\ 0 & 1 \end{bmatrix}$$

$$B = \begin{bmatrix} 0 \\ B_{21} \end{bmatrix}$$

and $$L = \left[ -b_1 \cdot G_v - G_v - 2 \cdot b_1 \cdot \frac{1}{B_{21}} \right].$$

4. A magnetic disk apparatus comprising:

a driving section for moving a magnetic head recoding and reproducing information in a magnetic disk; and a controller for controlling the driving section, the controller including:

a position-error feedback control system having an integrator and a phase lead compensator and obtaining a position command based on difference between target position and detection position of the magnetic head to perform feedback control of the driving section; and a two-freedom-degree control system inputting a target move distance of the magnetic head and outputting a current command to the driving section by using a mathematic model of the driving section, and a velocity feedback control system using velocity and position of the mathematical model, and the driving section is provided with an output of the velocity feedback control system and an output of the integrator in the positioning control, the controller providing the driving section with an output of the integrator and therewith updating the mathematical model by using an output of the phase lead compensator, in each of the times of positioning control and seek of the magnetic head, the position of the magnetic head to the output of the velocity feedback control system being equal to the output of the phase lead compensator in the positioning control.

5. A method for controlling a magnetic head in which the magnetic head recoding and reproducing information in a magnetic disk is moved, comprising:

performing feedback control of a driving section of the magnetic head by obtaining position command based on difference between target position and detection position of the magnetic head by using an integrator and a phase lead compensator, therewith performing control by inputting a target move distance of the magnetic head and outputting a current command to the driving section by using a mathematic model of the driving section, and providing the driving section with an output of the integrator and therewith updating the mathematical model by using an output of the phase lead compensator, in each of the times of positioning control and seek of the magnetic head, a velocity feedback gain Gv determining a state in the positioning control being set so that a matrix $$A + BL = \begin{bmatrix} 1 & 2 \\ -B_{21} \cdot b_1 \cdot G_v & 1 + (-B_{21} \cdot G_v - 2 \cdot b_1) \end{bmatrix}$$

has an eigenvalue of zero, where b1 represents inclination of a target velocity curve, B21 represents model gain, $$A = \begin{bmatrix} 1 & 2 \\ 0 & 1 \end{bmatrix}$$

$$B = \begin{bmatrix} 0 \\ B_{21} \end{bmatrix}$$

and $$L = \left[ -b_1 \cdot G_v - G_v - 2 \cdot b_1 \cdot \frac{1}{B_{21}} \right].$$

6. A method for controlling a magnetic head in which the magnetic head recoding and reproducing information in a magnetic disk is moved, comprising:

performing feedback control of a driving section of the magnetic head by obtaining position command based on difference between target position and detection position of the magnetic head by using an integrator and a phase lead compensator, therewith performing control by inputting a target move distance of the magnetic head and outputting a current command to the driving section by using a mathematic model of the driving section, and providing the driving section with an output of the integrator and therewith updating the mathematical model by using an output of the phase lead compensator, in each of the times of positioning control and seek of the magnetic head, a velocity feedback gain determining a state in the positioning control being an inverse number of a model gain of the mathematical model.

7. A method for controlling a magnetic head in which the magnetic head recoding and reproducing information in a magnetic disk is moved, comprising:

performing feedback control of a driving section of the magnetic head by obtaining position command based on difference between target position and detection position of the magnetic head by using an integrator and a phase lead compensator, therewith performing control by inputting a target move distance of the magnetic head and outputting a current command to the driving section by using a mathematic model of the driving section, and providing the driving section with an output of the integrator and therewith updating the mathematical model by using an output of the phase lead compensator, in each of the times of positioning control and seek of the magnetic head, the mathematical model being provided with the output of the phase compensator, through a gain vector, the gain vector being a gain vector in which an eigenvector for an eigenvalue of zero of a matrix $$A + BL = \begin{bmatrix} 1 & 2 \\ -B_{21} \cdot b_1 \cdot G_v & 1 + (-B_{21} \cdot G_v - 2 \cdot b_1) \end{bmatrix}$$

is multiplied by a constant, where b1 represents inclination of a target velocity curve, Gv represents a velocity feedback gain, B21 represents model gain, $$A = \begin{bmatrix} 1 & 2 \\ 0 & 1 \end{bmatrix}$$

$$B = \begin{bmatrix} 0 \\ B_{21} \end{bmatrix}$$

and $$L = \left[ -b_1 \cdot G_v - G_v - 2 \cdot b_1 \cdot \frac{1}{B_{21}} \right].$$

8. A method for controlling a magnetic head in which the magnetic head recoding and reproducing information in a magnetic disk is moved, comprising:

performing feedback control of a driving section of the magnetic head by obtaining position command based on difference between target position and detection position of the magnetic head by using an integrator and a phase lead compensator, therewith performing control by inputting a target move distance of the magnetic head and outputting a current command to the driving section by using a mathematic model of the driving section, providing the driving section with an output of the integrator and therewith updating the mathematical model by using an output of the phase lead compensator, in each of the times of positioning control and seek of the magnetic head, further performing velocity feedback control by using velocity and position of the mathematical model, and providing the driving section with an output of the velocity feedback control system and an output of the integrator in the positioning control, the position of the magnetic head to the output of the velocity feedback control being equal to the output of the phase lead compensator in the positioning control.

* * * * *